United States Patent
Liu et al.

(10) Patent No.: US 12,540,945 B2
(45) Date of Patent: Feb. 3, 2026

(54) PROBE AND METHOD FOR IDENTIFYING HOST CELL PROTEIN IMPURITIES

(71) Applicant: Regeneron Pharmaceuticals, Inc., Tarrytown, NY (US)

(72) Inventors: Gaoyuan Liu, White Plains, NY (US); Xiaojing Zheng, Gaithersburg, MD (US); Ning Li, New Canaan, CT (US)

(73) Assignee: Regeneron Pharmaceuticals, Inc., Tarrytown, NY (US)

(*) Notice: Subject to any disclaimer, the term of this patent is extended or adjusted under 35 U.S.C. 154(b) by 736 days.

(21) Appl. No.: 17/896,496

(22) Filed: Aug. 26, 2022

(65) Prior Publication Data
US 2023/0083288 A1    Mar. 16, 2023

Related U.S. Application Data

(60) Provisional application No. 63/237,614, filed on Aug. 27, 2021.

(51) Int. Cl.
| | |
|---|---|
| *G01N 33/68* | (2006.01) |
| *C12Q 1/44* | (2006.01) |
| *G01N 33/543* | (2006.01) |
| *G01N 33/573* | (2006.01) |

(52) U.S. Cl.
CPC ........... *G01N 33/6842* (2013.01); *C12Q 1/44* (2013.01); *G01N 33/573* (2013.01); *G01N 33/6848* (2013.01); *G01N 33/54313* (2013.01)

(58) Field of Classification Search
CPC ............ G01N 33/6842; G01N 33/573; G01N 33/6848; G01N 33/54313; C12Q 1/44
See application file for complete search history.

(56) References Cited

PUBLICATIONS

Dafik et al, Fluorinated Lipid Constructs Permit Facile Passage of Molecular Cargo into Living Cells, J. Am. Chem. Soc. 2009, 131, 34, 12091-12093 (Year: 2009).*
Li et al, Profiling Active Enzymes for Polysorbate Degradation in Biotherapeutics by Activity-Based Protein Profiling, Analytical Chemistry, May 25, 2021 93 (23), 8161-8169. (Year: 2021).*
Dafik Laila et al: "Fluorinated Lipid Constructs Permit Facile Passage of Molecular Cargo into Living Cells", Journal of the American Chemical Society, vol. 131, No. 34, Sep. 2, 2009 (Sep. 2, 2009), pp. 12091-12093, XP055981005, ISSN: 0002-7863, DOI: 10.1021/ja902777d.
Li Xuanwen et al: "Profiling Active Enzymes for Polysorbate Degradation in Biotherapeutics by Activity-Based Protein Profiling", Analytical Chemistry, May 25, 2021 (May 25, 2021), pp. 1-9, XP055809534, US ISSN: 0003-2700, DOI: 10.1021/acs.analchem.1c00042, Retrieved from the Internet: URL:https://pubs.acs.org/doi/pdf/10.1021/a cs.analchem.1c00042.
PCT Search Report and Written Opinion for Application No. PCT/US2022/041666, mailed on Dec. 22, 2022.

* cited by examiner

*Primary Examiner* — Dennis White
(74) *Attorney, Agent, or Firm* — Schwabe, Williamson & Wyatt PC; David Mellman

(57) ABSTRACT

The present invention generally pertains to methods of detecting host cell proteins. In particular, the present invention pertains to the use of a novel activity-based protein profiling probe to identify host cell proteins with lipase activity in a pharmaceutical formulation.

25 Claims, 25 Drawing Sheets

FIG. 5A

| Serial Number | Accession | Description | Fold change to tryptic digestion | | | |
|---|---|---|---|---|---|---|
| | | | DMSO | FP-desthiobiotin | FP-biotin | Novel Probe |
| | | Lipases | | | | |
| 1 | A0A061HN3 | Platelet-activating factor acetylhydrolase 2, cytoplasmic-like protein (PLA2G7) | 0.0 | 4.6 | 8.8 | 12.3 |
| 2 | G3IK30 | Glycerol-3-phosphate acyltransferase 3 | 2.0 | 1.7 | 2.3 | 35.4 |
| 3 | G3HGQ9 | 1-acyl-sn-glycerol-3-phosphate acyltransferase delta | 0.2 | 0.5 | 0.5 | 70.7 |
| 4 | A0A061IL50 | Monoacylglycerol lipase ABHD6-like protein | 0.1 | 27.0 | 61.8 | 61.4 |
| 5 | G3GRE5 | Lysophospholipase-like protein 1 | ND | 0.5 | 2.4 | 58.7 |
| 6 | G3I6H4 | Phospholipase DDHD1 (Fragment) | 0.1 | 0.1 | 0.2 | 131.1 |
| 7 | A0A061KA1 | Lipoprotein lipase | 0.0 | 50.0 | 94.4 | 112.7 |
| 8 | G3HKV9 | Group XV phospholipase A2 | 0.1 | 88.5 | 89.3 | 88.2 |
| 9 | G3H1J9 | Phospholipase DDHD2 | 0.0 | 0.0 | 0.2 | 160.2 |
| 10 | G3HQY6 | Lipase (Lysosomal acid lipase) | 0.0 | 0.1 | 0.1 | 32.8 |
| 11 | G3GWV5 | Phospholipase A2 (cytosolic phospholipase A2 alpha) | ND | ND | 0.3 | 0 |
| 12 | A0A061HWK1 | Hormone-sensitive lipase-like protein | ND | 0 | 0 | 0 |
| 13 | G3H8X2 | 1-acyl-sn-glycerol-3-phosphate acyltransferase gamma | ND | 0 | 0 | 0 |
| 14 | G3HZ22 | Monoacylglycerol lipase ABHD12 | ND | ND | ND | 0 |
| 15 | G3H0Y7 | Cytosolic phospholipase A2 delta | ND | ND | ND | 0 |

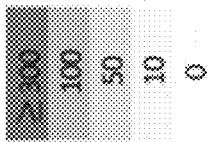

FIG. 5B

| Serial Number | Accession | Description | Fold change to tryptic digestion | | | |
|---|---|---|---|---|---|---|
| | | | DMSO | FP-desthiobiotin | FP-biotin | Novel Probe |
| | | Other hydrolases, peptidase, esterase, and transferases | | | | |
| 16 | G3GX04 | Dolichyl-diphosphooligosaccharide--protein glycosyltransferase subunit 2 | ND | ND | 1.0 | 37.1 |
| 17 | A0A0631JA6 | O-acyltransferase | ND | ND | ND | 59.6 |
| 18 | G3GTJ9 | Lipid phosphate phosphohydrolase 3 | ND | ND | 1.2 | 22.6 |
| 19 | A0A0611A36 | Ubiquitin carboxyl-terminal hydrolase 25 | ND | ND | ND | 29.7 |
| 20 | G3JNS2 | Carnitine O-palmitoyltransferase 1, liver isoform | 0.1 | 0.3 | 6.1 | 59.7 |
| 21 | G3HQ64 | 7-dehydrocholesterol reductase | ND | ND | ND | 21.8 |
| 22 | G3LY8 | Abhydrolase domain-containing protein 11 | 0.3 | 46.1 | 92.6 | 86.4 |
| 23 | A0A0611DG6 | Aminopeptidase | ND | ND | 0.7 | 51.4 |
| 24 | A0A0611DK5 | Geranylgeranyl transferase type-2 subunit beta | 0.3 | 0.2 | 6.4 | 6.2 |
| 25 | G3HJ22 | Trans-2,3-enoyl-CoA reductase | ND | 0.2 | 0.1 | 59.6 |
| 26 | G3JIX4 | Epoxide hydrolase 1 | 0.1 | 0.0 | ND | 44.7 |
| 27 | G3HVW4 | Neuropathy target esterase | ND | 1.2 | 19.5 | 15.8 |
| 28 | G3JSL8 | Abhydrolase domain-containing protein | 0.0 | 0.1 | 0.2 | 59.4 |
| 29 | G3HN89 | Palmitoyl-protein thioesterase 1 | ND | 0.0 | 0.0 | 61.9 |
| 30 | G3JIJ2 | PPPDE peptidase domain-containing protein 2 | ND | ND | ND | 113.3 |
| 31 | G3JIX5 | Epoxide hydrolase 1 | 0.1 | 0.1 | 0.1 | 12.3 |
| 32 | G3GX17 | Polypeptide N-acetylgalactosaminyltransferase | ND | 0.0 | 0.0 | 7.7 |
| 33 | G3HNY0 | Protein phosphatase methylesterase 1 | ND | 1.4 | 12.0 | 59.6 |
| 34 | G3HNH4 | Prostaglandin reductase 2 | ND | 24.5 | 45.9 | 8.0 |
| 35 | G3H1D5 | Carboxypeptidase | 0.1 | 29.5 | 85.6 | 59.4 |
| 36 | G3HNG2 | Acyl-coenzyme A thioesterase 2, mitochondrial | 0.0 | 2.5 | 10.1 | 60.7 |
| 37 | A0A0631NY2 | Geranylgeranyl transferase type-2 subunit beta | 0.0 | 0.0 | 0.1 | 23.2 |
| 38 | G3GX03 | Trifunctional enzyme subunit alpha, mitochondrial | 0.0 | 0.0 | 0.9 | 16.8 |

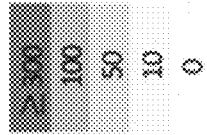

FIG. 5C

| Serial Number | Accession | Description | Fold change to tryptic digestion | | | |
|---|---|---|---|---|---|---|
| | | | DMSO | FP-desthiobiotin | FP-biotin | Novel Probe |
| 39 | G3J4A7 | Bifunctional methylenetetrahydrofolate dehydrogenase/cyclohydrolase, mitochondrial | 0.0 | 0.1 | 0.1 | 2.4 |
| 40 | G3H8V5 | Carboxypeptidase | 0.0 | 11.3 | 19.9 | 24.0 |
| 41 | G3JP80 | Acyl-protein thioesterase 2 | 0.1 | 31.0 | 45.3 | 28.6 |
| 42 | G3I366 | Prolyl endopeptidase | 0.0 | 20.8 | 75.1 | 91.9 |
| 43 | G3I3W4 | S-formylglutathione hydrolase | 0.0 | 0.8 | 3.7 | 77.0 |
| 44 | A0A0B17Y2 | Endonuclease domain-containing 1 protein | 0 | 0 | 0 | 0 |
| 45 | A0A098KX93 | Lysosomal thioesterase PPT2-like protein | 0 | 0 | 0 | 0 |
| 46 | G3GYL6 | Cytosolic carboxypeptidase 2 | ND | ND | ND | 0 |
| 47 | G3H3L4 | NADH-cytochrome b5 reductase | ND | ND | ND | 0 |
| 48 | G3HF97 | Abhydrolase domain-containing protein | ND | ND | ND | 0 |
| 49 | G3HUW5 | tRNA (guanine(26)-N(2))-dimethyltransferase | ND | ND | ND | 0 |
| 50 | G3IEF0 | UbiA prenyltransferase domain-containing protein 1 | ND | ND | ND | 0 |
| 51 | G3I7Y9 | GPI mannosyltransferase 1 | ND | ND | ND | 0 |
| 52 | G3GTP1 | Abhydrolase domain-containing protein 13 | ND | ND | ND | 0 |

| Sample Group | Trypsin Abundance | | | |
|---|---|---|---|---|
| | DMSO | FP-desthiobiotin | FP-biotin | REGN Probe |
| Trypsin (porcine) | 3.9E+09 | 3.4E+09 | 3.4E+09 | 3.4E+09 |

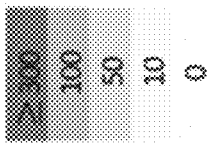

PROBE AND METHOD FOR IDENTIFYING HOST CELL PROTEIN IMPURITIES

CROSS-REFERENCE TO RELATED APPLICATIONS

This application claims priority to and the benefit of U.S. Provisional Patent Application No. 63/237,614, filed Aug. 27, 2021, which is herein incorporated by reference.

FIELD

The present invention generally pertains to probes and methods for identifying host cell protein impurities which have enzymatic activities. These probes and methods can be applied in biopharmaceutical products and in samples during manufacturing processes to identify and monitor host cell protein impurities.

BACKGROUND

Among drug products, protein-based biotherapeutics are an important class of drugs that offer a high level of selectivity, potency and efficacy, as evidenced by the considerable increase in clinical trials with monoclonal antibodies (mAbs) over the past several years. Bringing a protein-based biotherapeutic to the clinic can be a multiyear undertaking requiring coordinated efforts throughout various research and development disciplines, including discovery, process and formulation development, analytical characterization, and pre-clinical toxicology and pharmacology.

One critical aspect for a clinically and commercially viable biotherapeutic is stability of the drug product in terms of the manufacturing process as well as shelf life. This often necessitates appropriate steps to help increase physical and chemical stability of the protein-based biotherapeutics throughout the different solution conditions and environments necessary for manufacturing and storage with minimal impact on product quality, including identifying molecules with greater inherent stability, protein engineering, and formulation development.

Surfactants such as polysorbate are often used to enhance the physical stability of a protein-based biotherapeutic product. Over seventy percent of marketed monoclonal antibody therapeutics contain between 0.001% and 0.1% polysorbate, a type of surfactant, to impart physical stability to the protein-based biotherapeutics. Polysorbates are susceptible to auto-oxidation and hydrolysis, which results in free fatty acids and subsequent fatty acid particle formation. The degradation of polysorbate can adversely affect drug product quality since polysorbate can protect against interfacial stress, such as aggregation and adsorption. Presence of some lipases can be a likely cause of degradation of polysorbates in a formulation. Thus, lipases in drug products need to be detected, monitored and reduced.

Direct analysis of lipases can require isolation of the product in a sufficiently large amount for the assay, which is undesirable and has only been possible in select cases. Hence, it is a challenging task to determine the workflow and analytical tests required to characterize lipases responsible for polysorbate degradation in a sample. In addition to detecting the lipases responsible for polysorbate degradation, the drug product must be obtained by purification methods that remove or reduce such lipases.

It will be appreciated that a need exists for probes and methods for identifying, characterizing, and depleting host cell proteins such as lipases from a formulated drug product.

SUMMARY

Defining acceptable levels of host cell protein (HCP) impurities has become a critical issue for using biological systems to manufacture therapeutic products. There are a large number of HCP impurities which have to be controlled and monitored to ensure the safety and efficacy of biopharmaceutical products. An important class of HCP impurities are lipases, which can degrade polysorbate, a common excipient used to ensure therapeutic protein stability.

This disclosure provides methods for identifying, profiling, characterizing or quantifying HCP impurities which have serine hydrolase enzymatic activities. These methods can be used to identify and monitor HCP impurities in biopharmaceutical products and in samples at any stage of the manufacturing process, including providing novel activity-based probes to sensitively and specifically enrich for enzymes. In some exemplary embodiments, said probe comprises a tag, a linker covalently coupled to said tag, a warhead covalently coupled to said linker, and a tail including a fatty acyl chain, said tail covalently coupled to said warhead, wherein said warhead is capable of chemically reacting with said enzyme and said tag allows for capture and/or detection of said enzyme.

In one aspect, said tag can be selected from a group consisting of rhodamine, biotin, phosphine, alkyne, azide, acetylene, cyclooctyne, phenyl azide, or omega-terminal azide. In another aspect, said linker can be derived from polyethylene glycol. In yet another aspect, said warhead can be selected from a group consisting of fluorophosphonate, epoxysuccinate, N-acetylated amino acid, quinolimine methide coupled amino acid, or p-aminomandelic acid coupled amino acid.

In one aspect, said tag comprises biotin, said linker can be derived from polyethylene glycol, and said warhead comprises fluorophosphonate. In an additional aspect, said fatty acyl chain comprises between 10 and 20 carbons, between 12 and 18 carbons, between 14 and 16 carbons, or about 16 carbons. In a further aspect, said fatty acyl chain is a 16-carbon fatty acyl chain. In another aspect, the structure of said probe is the probe structure as shown in FIG. 4B.

This disclosure additionally provides methods for characterizing at least one host cell protein in a sample. In some exemplary embodiments, said method comprises (a) contacting a sample comprising at least one host cell protein to a probe to form a captured host cell protein, wherein said probe comprises a tag, a linker covalently coupled to said tag, a warhead covalently coupled to said linker, and a tail including a fatty acyl chain, said tail covalently coupled to said warhead, wherein said warhead is capable of chemically reacting with said host cell protein and said tag allows for capture and/or detection of said host cell protein; (b) contacting said captured host cell protein to a solid substrate, wherein said solid substrate is capable of binding to the tag of said probe, to form a substrate-bound host cell protein; (c) isolating said substrate-bound host cell protein; (d) contacting said isolated substrate-bound host cell protein of (c) to at least one digestive enzyme to form a peptide mixture; and (e) subjecting said peptide mixture to mass spectrometry analysis to characterize said at least one host cell protein.

In one aspect, said host cell protein includes a cysteine protease active site, a serine protease active site, a serine hydrolase active site, a cathepsin active site, a metalloprotease active site, a cholinesterase active site, a lipase active site, a protease active site, a hydrolase active site, an oxidoreductase active site, or an isomerase active site.

In one aspect, said tag is selected from a group consisting of biotin, phosphine, alkyne, azide, acetylene, cyclooctyne, phenyl azide, or omega-terminal azide. In another aspect, said linker is derived from polyethylene glycol. In yet another aspect, said warhead is selected from a group consisting of fluorophosphonate, epoxysuccinate, N-acetylated amino acid, quinolimine methide coupled amino acid, or p-aminomandelic acid coupled amino acid.

In one aspect, said tag comprises biotin, said linker is derived from polyethylene glycol, and said warhead comprises fluorophosphonate. In an additional aspect, said fatty acyl chain comprises between 10 and 20 carbons, between 12 and 18 carbons, between 14 and 16 carbons, or about 16 carbons. In a further aspect, said fatty acyl chain is a 16-carbon fatty acyl chain. In another aspect, the structure of said probe is the probe structure as shown in FIG. 4B.

In one aspect, said solid substrate comprises agarose beads or magnetic beads. In another aspect, said solid substrate binds to said tag using a reagent selected from a group consisting of avidin, streptavidin, alkyne or azide.

In one aspect, said isolation is performed using centrifugation. In another aspect, said digestive enzyme is trypsin.

In one aspect, said mass spectrometer is an electrospray ionization mass spectrometer, nano-electrospray ionization mass spectrometer, Q-TOF mass spectrometer, or a triple quadrupole mass spectrometer.

In one aspect, said mass spectrometer is coupled to a liquid chromatography system. In a specific aspect, said mass spectrometer is capable of performing LC-MS (liquid chromatography-mass spectrometry), nano-LC-MS, LC-MS/MS, nano-LC-MS/MS, or LC-MRM-MS (liquid chromatography-multiple reaction monitoring-mass spectrometry) analysis. In another specific aspect, said liquid chromatography comprises reverse phase liquid chromatography, ion-exchange chromatography, size exclusion chromatography, affinity chromatography, hydrophobic interaction chromatography, hydrophilic interaction chromatography, mixed-mode chromatography, or a combination thereof.

In one aspect, said sample comprises a protein of interest. In a specific aspect, said protein of interest is a monoclonal antibody or a bispecific antibody.

These, and other, aspects of the invention will be better appreciated and understood when considered in conjunction with the following description and accompanying drawings. The following description, while indicating various embodiments and numerous specific details thereof, is given by way of illustration and not of limitation. Many substitutions, modifications, additions, or rearrangements can be made within the scope of the invention.

BRIEF DESCRIPTION OF THE DRAWINGS

FIG. 5A shows enrichment of proteins from ExpiCHO-S null cell lysate using various ABPP probes, according to an exemplary embodiment.

FIG. 5B shows enrichment of proteins from ExpiCHO-S null cell lysate using various ABPP probes, according to an exemplary embodiment.

FIG. 5C shows enrichment of proteins from ExpiCHO-S null cell lysate using various ABPP probes, according to an exemplary embodiment.

FIG. 6A shows the signal intensities of proteins enriched from ExpiCHO-S null cell lysate using various ABPP probes, according to an exemplary embodiment.

FIG. 6B shows the signal intensities of proteins enriched from ExpiCHO-S null cell lysate using various ABPP probes, according to an exemplary embodiment.

FIG. 11A shows proteins from the top 100 proteins enriched by a novel probe, according to an exemplary embodiment.

FIG. 11B shows proteins from the top 100 proteins enriched by a novel probe, according to an exemplary embodiment.

FIG. 11C shows proteins from the top 100 proteins enriched by a novel probe, according to an exemplary embodiment.

FIG. 12A shows proteins from the top 100 proteins enriched by the FP-biotin probe, according to an exemplary embodiment.

FIG. 12B shows proteins from the top 100 proteins enriched by the FP-biotin probe, according to an exemplary embodiment.

FIG. 12C shows proteins from the top 100 proteins enriched by the FP-biotin probe, according to an exemplary embodiment.

DETAILED DESCRIPTION

Host cell proteins (HCPs) are a class of impurities found in all cell-derived protein therapeutics. The FDA does not specify a maximum acceptable level of HCPs, but HCP concentrations in final drug product must be controlled and reproducible from batch to batch (FDA, 1999). A primary safety concern relates to the possibility that HCPs can cause antigenic effects in human patients (Satish Kumar Singh, Impact of Product-Related Factors on Immunogenicity of Biotherapeutics, and 100 JOURNALS OF PHARMACEUTICAL SCIENCES 354-387 (2011)). In addition to adverse health consequences for the patient, enzymatically active HCPs can potentially affect product quality during processing or long-term storage (Sharon X. Gao et al., Fragmentation of a highly purified monoclonal antibody attributed to residual CHO cell protease activity, 108 BIOTECHNOLOGY AND BIOENGINEERING 977-982 (2010); Flavie Robert et al., Degradation of an Fc-fusion recombinant protein by host cell proteases: Identification of a CHO cathepsin D protease, 104 BIOTECHNOLOGY AND BIOENGINEERING 1132-1141 (2009)). HCPs can persist through purification operations into the final drug product.

During long-term storage, the critical quality attributes of the product molecule should be maintained, and degradation of excipients in the final product formulation should be minimized. Several biopharmaceutical protein formulations on the market comprise polysorbate as one of the most commonly used nonionic surfactants that can improve protein stability and protect drug products from aggregation and denaturation (Sylvia Kiese et al., Shaken, Not Stirred: Mechanical Stress Testing of an IgG1 Antibody, 97 JOURNAL OF PHARMACEUTICAL SCIENCES 4347-4366 (2008); Ariadna Martos et al., Trends on Analytical Characterization of Polysorbates and Their Degradation Products in Biopharmaceutical Formulations, 106 JOURNAL OF PHARMACEUTICAL SCIENCES 1722-1735 (2017)). Polysorbates are derived from hydrophobic fatty acid esterified to hydrophilic poly(ethylene glycol) (PEG) sorbitan. Polysorbate 20 (PS20) and polysorbate 80 (PS80) are the most commonly used nonionic surfactants in biopharmaceutical protein formulations. Typical polysorbate concentrations in drug products sufficient to ensure protein stability can range between about 0.001% and about 0.1% (w/v).

Figure 1:
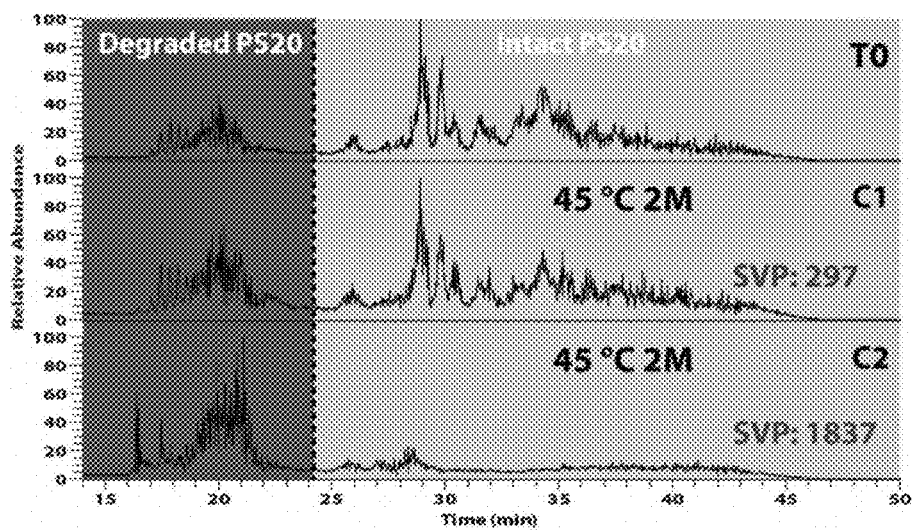
FIG. 1 shows degradation of polysorbate 20 (PS20) and subvisible particle (SVP) formation in a recombinant protein product over time, according to an exemplary embodiment.
Figure 2:
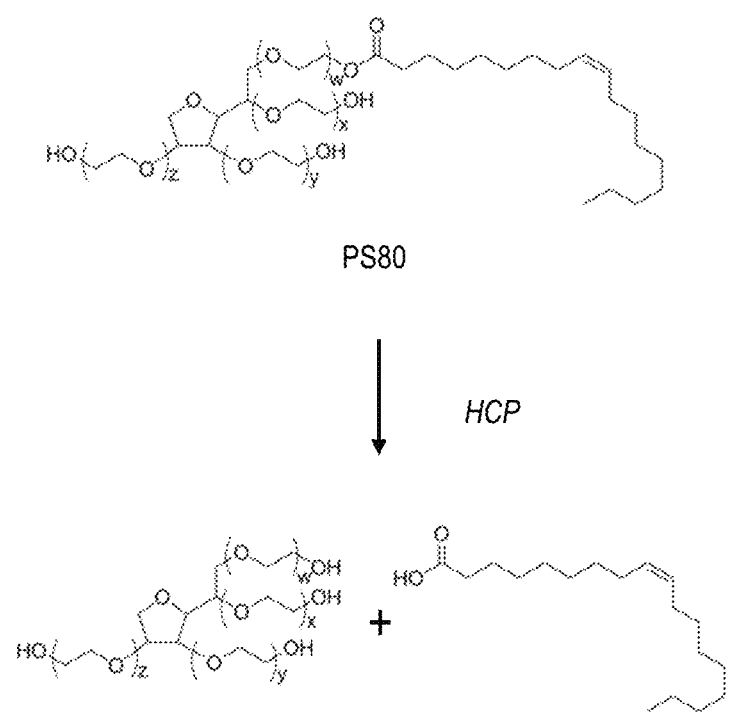
FIG. 2 illustrates hydrolysis of polysorbate 80 (PS80) by an HCP, according to an exemplary embodiment.

Polysorbates, however, are liable to degradation that can lead to protein aggregation and the formation of subvisible particles in formulated drug substances. Polysorbates are known to degrade by two main pathways: auto-oxidation and hydrolysis. Polysorbates can undergo hydrolysis by breaking of the fatty acid ester bond. The particulates originating from degradation of polysorbates can form visible or sub-visible particles, as shown in FIG. 1 and FIG. 2. This can include fatty acid particles that are formed during manufacture, shipment, storage, handling or administration of drug formulations comprising polysorbate. Formation of particles raises the potential for immunogenicity in patients and can have varying effects on drug product quality. Additionally, the degradation of polysorbates can cause reduction in the total amount of surfactant in the formulation, affecting the product's stability during its manufacturing, storage, handling, and administration.

Typically, polysorbate degradation can only be observed in drug products after a fairly long storage time. However, degradation on shorter timescales has been observed, suggesting the presence of unidentified lipase(s) in a drug substance. It is important to detect and reduce concentrations of such lipases in order to maintain the stability of the drug formulation.

Several lipases have been identified as a root cause of polysorbate degradation, such as lipoprotein lipase (LPL), lysosomal acid lipase (LAL), sialate O-acetylesterase, and liver carboxylesterase. Putative phospholipase B-like 2 (PLBD2) was the first host cell protein that was proposed to cause an enzymatic hydrolysis of PS20 (Nitin Dixit et al., Residual Host Cell Protein Promotes Polysorbate 20 Degradation in a Sulfatase Drug Product Leading to Free Fatty Acid Particles, 105 JOURNAL OF PHARMACEUTICAL SCIENCES 1657-1666 (2016)). Porcine liver esterase was reported to be able to specifically hydrolyze polysorbate 80 (not PS20) and lead to the formation of PS85 over time in mAb drug product (Steven R. Labrenz, Ester Hydrolysis of Polysorbate 80 in mAb Drug Product: Evidence in Support of the Hypothesized Risk After the Observation of Visible Particulate in mAb Formulations, 103 JOURNAL OF PHARMACEUTICAL SCIENCES 2268-2277 (2014)). Group XV lysosomal phospholipase A2 isomer X1 (LPLA2) demonstrated the ability to degrade PS20 and PS80 at less than 1 ppm (Troii Hall et al., Polysorbates 20 and 80 Degradation by Group XV Lysosomal Phospholipase A 2 Isomer X1 in Monoclonal Antibody Formulations, 105 JOURNAL OF PHARMACEUTICAL SCIENCES 1633-1642 (2016) and Ying Cheng et al., A Rapid High-Sensitivity Reversed-Phase Ultra High Performance Liquid Chromatography Mass Spectrometry Method for Assessing Polysorbate 20 Degradation in Protein Therapeutics, 108 JOURNAL OF PHARMACEUTICAL SCIENCES 2880-2886 (2019)). Therefore, profiling, identifying, characterizing and/or quantifying active lipases in host cell proteins are critical for biotherapeutic development and manufacturing.

It can be helpful to evaluate the effect of a host-cell protein co-purified with a drug product on polysorbates to ensure stability of the drug formulation. This can require identification of the host-cell protein and its ability to degrade polysorbates. Identification of host-cell proteins can be particularly challenging since the presence of HCPs is generally in the ppm range, which makes the isolation and identification of HCPs difficult. Multianalyte enzyme-linked immunosorbent assay (ELISA) based on polyclonal anti-HCP antibody is the most commonly used method for total HCP analysis because of its sensitivity, selectivity, and high throughput. However, ELISA has a limited coverage of host cell proteins because HCPs with no or low immunoreactivity cannot be effectively recognized by anti-HCP antibody. Additionally, multianalyte ELISA can only detect the total HCP level and not individual protein levels, and this feature makes multianalyte ELISA less useful when specific HCP species need to be identified and quantified.

Recently, liquid chromatography-tandem mass spectrometry (LC-MS/MS) has been extensively used as an orthogonal method for HCP analysis because LC-MS/MS does not exhibit a bias among HCP species with different immunoreactivities and can determine the identity and quantity of individual problematic HCP species. However, in purified biotherapeutics, the large dynamic range between therapeutic proteins and HCPs restricts the detection limit for HCP species. For direct trypsin digestion and LC-MS/MS in a data-dependent analysis mode, the best detection limit of individual HCP species is approximately 10 ppm relative to therapeutic protein. This sensitivity may not be sufficient because some lipases with abundances lower than 10 ppm can cause significant polysorbate degradation. Therefore, different methods have been developed to increase the sensitivity of LC-MS/MS-based HCP analysis, including native digestion, pro-A depletion, ultralow trypsin digestion, molecular weight cutoff filtering, ProteoMiner enrichment, and 2D LC-MS/MS. These methods also have limitations. For example, native digestion can only be used with immunoglobulins that cannot be well digested without denaturing and reduction, rendering this method unsuitable for biotherapeutics that can be digested under native conditions, such as fusion proteins, vaccines, and adeno-associated viruses.

Figure 3A:
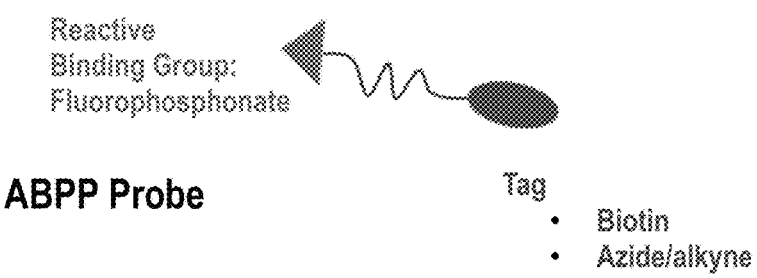
FIG. 3A illustrates an exemplary activity-based protein profiling (ABPP) probe structure, according to an exemplary embodiment.
Figure 3B:
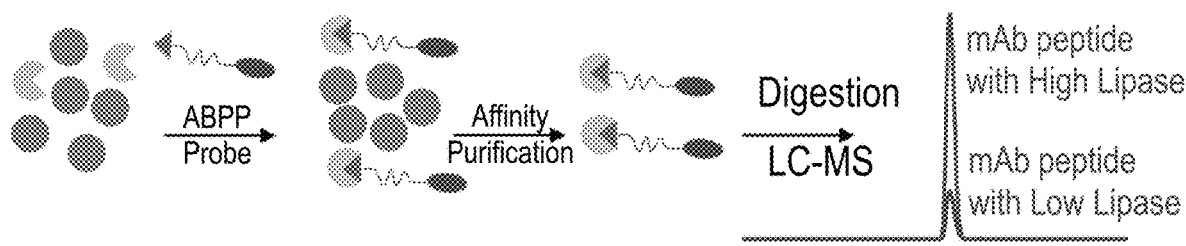
FIG. 3B illustrates an exemplary method of enrichment of HCP lipases using an ABPP probe, according to an exemplary embodiment.

Detection of particular HCPs can be improved using enrichment techniques. Recently, activity-based protein profiling (ABPP) has been used to analyze HCPs that catalyze polysorbate degradation (Li et al., 2021, Anal. Chem., 93, 8161, which is hereby incorporated by reference). In contrast to conventional global proteomic methods, ABPP utilizes chemical probes to analyze discrete classes of proteins based on their enzymatic activity (Cravatt et al., 2008, Annu. Rev. Biochem., 77, 383; Liu et al., 1999, PNAS, 96, 14694, which are hereby incorporated by reference). A probe (ABPP probe) comprising a tag and a reactive moiety (warhead) chemically reacts with the active site of an enzyme, allowing for isolation and enrichment of targeted enzymes, as shown in FIG. 3A. Enriched enzymes may then be subjected to LC-MS analysis for identification and quantification, as shown in FIG. 3B.

ABPP has several advantages over conventional proteomic methods. One advantage of this method is that enzymes can be identified and prioritized based on activity levels, instead of simply protein concentration, which may not be indicative of the effect that the enzyme has on product quality. This additionally means that enzymes can be probed based on their particular enzymatic function in order to assess the role of proteins in different pathways. Secondly, ABPP can be used to detect and enrich very-low-abundance enzymes in highly complex biological samples. Thirdly, ABPP can distinguish active enzymes from their inactive zymogens or denatured proteins.

Different activity-based probes can be used to characterize different enzyme classes. Activity-based probes can covalently bind to specific enzymatic active sites for profiling different classes of enzymes based on specific catalytic mechanisms. For example, ABPP probes comprising a fluorophosphonate group can covalently bind to the active site of the serine hydrolase class of enzymes, to enrich serine hydrolase HCP impurities.

Activity-based probes can also structurally mimic an enzymatic substrate for profiling different classes of enzymes based on specific enzymatic targets. For example, ABPP probes structurally mimicking a polysorbate molecule can preferentially associate with lipases that target polysorbate, to enrich lipase HCP impurities. Conversely, an activity-based probe that does not mimic an enzymatic substrate can be less effective at capturing an enzyme targeting that substrate.

Activity-based protein profiling has been used to characterize catalytic activity of enzyme classes in complex proteome, rather than quantitating protein abundance. Activity-based protein profiling can be used to functionally annotate the enzyme functions of proteins. Different probes have been used to differentially label active proteins including proteases, hydrolases, oxidoreductases and isomerases (Blais et al., Activity-based proteome profiling of hepatoma cells during Hepatitis C virus replication using protease substrate probes, Journal of Proteome Research, 2010 Feb. 5; 9(2): 912-23. doi: 10.1021/pr900788a, which is hereby incorporated by reference). Activity-based protein profiling also has been used to monitor the functional status of enzymes by utilizing active site-directed probes, such as detecting and analyzing functional annotation of host cell serine hydrolases for host-virus interaction (Shahiduzzaman et al., Activity based protein profiling to detect serine hydrolase alterations in virus infected cells, Frontiers in Microbiology, Aug. 22, 2012, volume 3, article 308, p 1-5, which is hereby incorporated by reference). In addition, since activity-based probes can specifically recognize active proteases, they can be used to detect and quantitate proteolytic activity in situ, especially in conjunction with positron emission tomography (Ulrich auf dem Keller et al., Proteomic techniques and activity-based probes for the system-wide study of proteolysis, Biochimie, 92 (2010), page 1705-1714, which is hereby incorporated by reference). Because activity-based probes covalently bind to the active site of enzymes of interest, they can also be used to functionally deplete target HCPs from a sample.

Figure 4A:
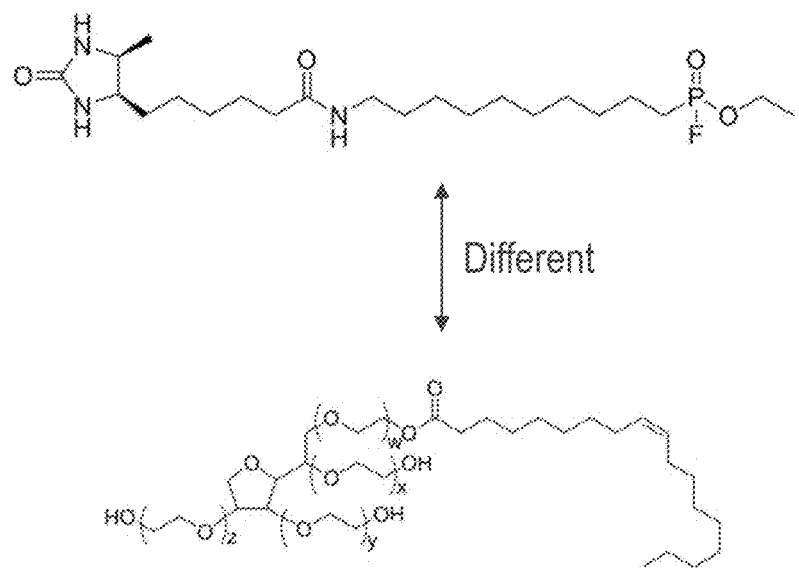
FIG. 4A shows a comparison of the structures of a commercially available ABPP probe versus polysorbate, according to an exemplary embodiment.

ABPP probes are commercially available for capturing serine hydrolases, for example Pierce™ ActivX™ Serine Hydrolase Probes (Thermo Fisher Scientific). Structures of commercially available FP-biotin and FP-desthiobiotin probes are shown in FIG. 8C and FIG. 8D, respectively. However, these probes have low solubility in aqueous buffer. Additionally, for the purposes of capturing lipases that target polysorbate for degradation, these probes have poor structural similarity with polysorbate, which leads to low selectivity for the relevant lipases, as shown in FIG. 4A.

A rational design of an ABPP probe structure is important for ensuring the efficiency and specificity of an ABPP proteomic method (Saghetalian et al., 2004, PNAS, 101, 10000, which is hereby incorporated by reference). For example, Tully et al. designed and synthesized phospholipid-like ABPP probes that can selectively target phospholipases with different regiospecificities (Tully et al., 2010, J. Am. Chem. Soc., 132, 3264, which is hereby incorporated by reference).

Figure 4B:
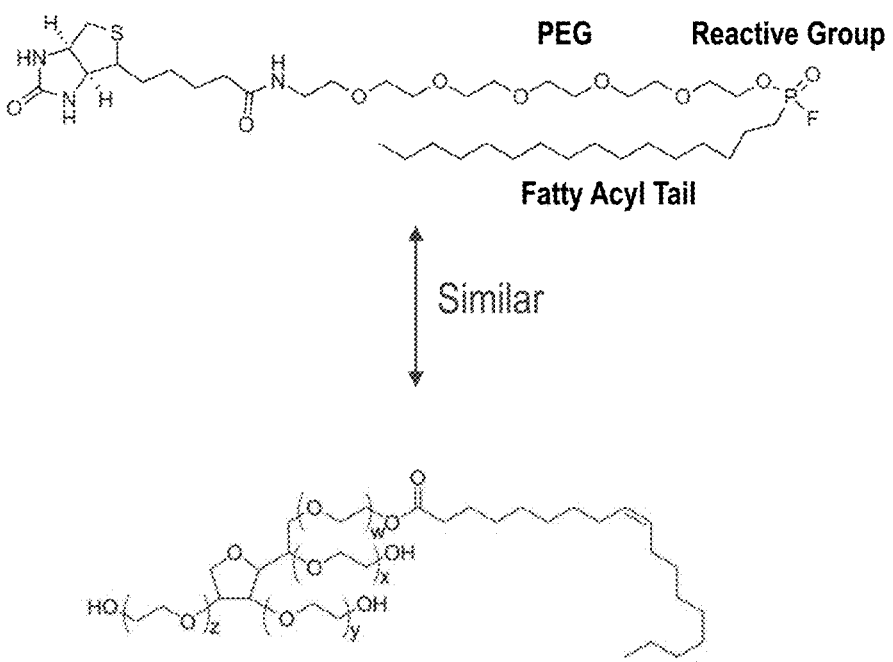
FIG. 4B shows a comparison of the structures of a novel ABPP probe versus polysorbate, according to an exemplary embodiment.

This disclosure describes the design and synthesis of novel ABPP probes to comprehensively profile the lipases that catalyze polysorbate degradation in biotherapeutics. ABPP probes of the present invention can enrich serine hydrolase lipase HCPs. In one embodiment, a synthesized ABPP probe of the present invention features better solubility and better structural similarity with polysorbate compared to commercially available probes, which leads to better selectivity and sensitivity when capturing the lipases that catalyze polysorbate degradation, as shown in FIG. 4B. This improved function allows for the detection of lipases at any step of the production process of a recombinant protein product. In one embodiment, a probe of the present invention also contains a fluorophosphonate group for serine active site labeling and a biotin tag for affinity purification.

Compared with commercial ABPP probes, the novel probes of the present invention exhibit higher enrichment efficiency for lipases. Importantly, the novel probes can label some lipases that cannot be enriched by commercial ABPP probes, including LAL and cytosolic phospholipase A2. Furthermore, in one embodiment, the novel probe was able to efficiently detect several lipases with abundances as low as 0.08 ppm. Finally, characterization of a lipase labeled by a novel probe of the present invention using peptide mapping showed that the serine active site was labeled by the probe, indicating that the covalent modification of lipase by the novel probes of the present invention is specific to the enzyme's catalytic active site.

The ABPP probe of the present invention can be used to identify HCPs for the purpose of, for example, optimizing a production process, conducting quality assurance, or identifying a source of undesirable polysorbate degradation or product instability.

Unless described otherwise, all technical and scientific terms used herein have the same meaning as commonly understood by one of ordinary skill in the art to which this invention belongs. Although any methods and materials similar or equivalent to those described herein can be used in the practice or testing, particular methods and materials are now described.

The term "a" should be understood to mean "at least one" and the terms "about" and "approximately" should be understood to permit standard variation as would be understood by those of ordinary skill in the art, and where ranges are provided, endpoints are included. As used herein, the terms "include," "includes," and "including" are meant to be non-limiting and are understood to mean "comprise," "comprises," and "comprising" respectively.

As used herein, the term "protein" or "protein of interest" can include any amino acid polymer having covalently linked amide bonds. Proteins comprise one or more amino acid polymer chains, generally known in the art as "polypeptides." "Polypeptide" refers to a polymer composed of amino acid residues, related naturally occurring structural variants, and synthetic non-naturally occurring analogs thereof linked via peptide bonds. "Synthetic peptide or polypeptide" refers to a non-naturally occurring peptide or polypeptide. Synthetic peptides or polypeptides can be synthesized, for example, using an automated polypeptide synthesizer. Various solid phase peptide synthesis methods are known to those of skill in the art. A protein can comprise one or multiple polypeptides to form a single functioning biomolecule. In another exemplary aspect, a protein can include antibody fragments, nanobodies, recombinant antibody chimeras, cytokines, chemokines, peptide hormones, and the like. Proteins of interest can include any of bio-therapeutic proteins, recombinant proteins used in research or therapy, trap proteins and other chimeric receptor Fc-fusion proteins, chimeric proteins, antibodies, monoclonal antibodies, polyclonal antibodies, human antibodies, and bispecific antibodies. Proteins can be produced using recombinant cell-based production systems, such as the insect bacculovirus system, yeast systems (e.g., *Pichia* sp.), and mammalian systems (e.g., CHO cells and CHO derivatives like CHO-K1 cells). For a recent review discussing biotherapeutic proteins and their production, see Ghaderi et al., "Production platforms for biotherapeutic glycoproteins. Occurrence, impact, and challenges of non-human sialylation" (Darius Ghaderi et al., Production platforms for biotherapeutic glycoproteins. Occurrence, impact, and challenges of non-human sialylation, 28 BIOTECHNOLOGY AND GENETIC ENGINEERING REVIEWS 147-176 (2012), the entire teachings of which are herein incorporated). In some exemplary embodiments, proteins comprise modifications, adducts, and other covalently linked moieties. These modifications, adducts and moieties include, for example, avidin, streptavidin, biotin, glycans (e.g., N-acetylgalactosamine, galactose, neuraminic acid, N-acetylglucosamine, fucose, mannose, and other monosaccharides), PEG, polyhistidine, FLAGtag, maltose binding protein (MBP), chitin binding protein (CBP), glutathione-S-transferase (GST) myc-epitope, fluorescent labels and other dyes, and the like. Proteins can be classified on the basis of compositions and solubility and can thus include simple proteins, such as globular proteins and fibrous proteins; conjugated proteins, such as nucleoproteins, glycoproteins, mucoproteins, chromoproteins, phosphoproteins, metalloproteins, and lipoproteins; and derived proteins, such as primary derived proteins and secondary derived proteins.

In some exemplary embodiments, the protein of interest can be a recombinant protein, an antibody, a bispecific antibody, a multispecific antibody, antibody fragment, monoclonal antibody, fusion protein, scFv and combinations thereof.

As used herein, the term "recombinant protein" refers to a protein produced as the result of the transcription and translation of a gene carried on a recombinant expression vector that has been introduced into a suitable host cell. In certain exemplary embodiments, the recombinant protein can be an antibody, for example, a chimeric, humanized, or fully human antibody. In certain exemplary embodiments, the recombinant protein can be an antibody of an isotype selected from the group consisting of: IgG, IgM, IgA1, IgA2, IgD, or IgE. In certain exemplary embodiments the antibody molecule is a full-length antibody (e.g., an IgG1) or alternatively the antibody can be a fragment (e.g., an Fc fragment or a Fab fragment).

The term "antibody," as used herein includes immunoglobulin molecules comprising four polypeptide chains, two heavy (H) chains and two light (L) chains inter-connected by disulfide bonds, as well as multimers thereof (e.g., IgM). Each heavy chain comprises a heavy chain variable region (abbreviated herein as HCVR or VH) and a heavy chain constant region. The heavy chain constant region comprises three domains, CH1, CH2 and CH3. Each light chain comprises a light chain variable region (abbreviated herein as LCVR or VL) and a light chain constant region. The light chain constant region comprises one domain (CL1). The VH and VL regions can be further subdivided into regions of hypervariability, termed complementarity determining regions (CDRs), interspersed with regions that are more conserved, termed framework regions (FR). Each VH and VL is composed of three CDRs and four FRs, arranged from amino-terminus to carboxy-terminus in the following order: FR1, CDR1, FR2, CDR2, FR3, CDR3, and FR4. In different embodiments of the invention, the FRs of the anti-big-ET-1 antibody (or antigen-binding portion thereof) can be identical to the human germline sequences or can be naturally or artificially modified. An amino acid consensus sequence can be defined based on a side-by-side analysis of two or more CDRs. The term "antibody," as used herein, also includes antigen-binding fragments of full antibody molecules. The terms "antigen-binding portion" of an antibody, "antigen-binding fragment" of an antibody, and the like, as used herein, include any naturally occurring, enzymatically obtainable, synthetic, or genetically engineered polypeptide or glycoprotein that specifically binds an antigen to form a complex. Antigen-binding fragments of an antibody can be derived, for example, from full antibody molecules using any suitable standard techniques such as proteolytic digestion or recombinant genetic engineering techniques involving the manipulation and expression of DNA encoding antibody variable and optionally constant domains. Such DNA is known and/or is readily available from, for example, commercial sources, DNA libraries (including, e.g., phage-antibody libraries), or can be synthesized. The DNA can be sequenced and manipulated chemically or by using molecular biology techniques, for example, to arrange one or more variable and/or constant domains into a suitable configuration, or to introduce codons, create cysteine residues, modify, add or delete amino acids, etc.

As used herein, an "antibody fragment" includes a portion of an intact antibody, such as, for example, the antigen-binding or variable region of an antibody. Examples of antibody fragments include, but are not limited to, a Fab fragment, a Fab' fragment, a F(ab')2 fragment, a scFv fragment, a Fv fragment, a dsFv diabody, a dAb fragment, a Fd' fragment, a Fd fragment, and an isolated complementarity determining region (CDR) region, as well as triabodies, tetrabodies, linear antibodies, single-chain antibody molecules, and multi specific antibodies formed from antibody fragments. Fv fragments are the combination of the variable regions of the immunoglobulin heavy and light chains, and ScFv proteins are recombinant single chain polypeptide molecules in which immunoglobulin light and heavy chain variable regions are connected by a peptide linker. In some exemplary embodiments, an antibody fragment comprises a sufficient amino acid sequence of the parent antibody of which it is a fragment that it binds to the same antigen as does the parent antibody; in some exemplary embodiments, a fragment binds to the antigen with a comparable affinity to that of the parent antibody and/or competes with the parent antibody for binding to the antigen. An antibody fragment can be produced by any means. For example, an antibody fragment can be enzymatically or chemically produced by fragmentation of an intact antibody and/or it can be recombinantly produced from a gene encoding the partial antibody sequence. Alternatively, or additionally, an antibody fragment can be wholly or partially synthetically produced. An antibody fragment can optionally comprise a single chain antibody fragment. Alternatively, or additionally, an antibody fragment can comprise multiple chains that are linked together, for example, by disulfide linkages. An antibody fragment can optionally comprise a multi-molecular complex. A functional antibody fragment typically comprises at least about 50 amino acids and more typically comprises at least about 200 amino acids.

The term "bispecific antibody" includes an antibody capable of selectively binding two or more epitopes. Bispecific antibodies generally comprise two different heavy chains with each heavy chain specifically binding a different epitope—either on two different molecules (e.g., antigens) or on the same molecule (e.g., on the same antigen). If a bispecific antibody is capable of selectively binding two different epitopes (a first epitope and a second epitope), the affinity of the first heavy chain for the first epitope will generally be at least one to two or three or four orders of magnitude lower than the affinity of the first heavy chain for the second epitope, and vice versa. The epitopes recognized by the bispecific antibody can be on the same or a different target (e.g., on the same or a different protein). Bispecific antibodies can be made, for example, by combining heavy chains that recognize different epitopes of the same antigen. For example, nucleic acid sequences encoding heavy chain variable sequences that recognize different epitopes of the same antigen can be fused to nucleic acid sequences encoding different heavy chain constant regions and such sequences can be expressed in a cell that expresses an immunoglobulin light chain.

A typical bispecific antibody has two heavy chains each having three heavy chain CDRs, followed by a CH1 domain, a hinge, a CH2 domain, and a CH3 domain, and an immunoglobulin light chain that either does not confer antigen-binding specificity but that can associate with each heavy chain, or that can associate with each heavy chain and that can bind one or more of the epitopes bound by the heavy chain antigen-binding regions, or that can associate with each heavy chain and enable binding of one or both of the heavy chains to one or both epitopes. BsAbs can be divided into two major classes, those bearing an Fc region (IgG-like) and those lacking an Fc region, the latter normally being smaller than the IgG and IgG-like bispecific molecules comprising an Fc. The IgG-like bsAbs can have different formats such as, but not limited to, triomab, knobs into holes IgG (kih IgG), crossMab, orth-Fab IgG, Dual-variable domains Ig (DVD-Ig), two-in-one or dual action Fab (DAF), IgG-single-chain Fv (IgG-scFv), or kk-bodies. The non-IgG-like different formats include tandem scFvs, diabody format, single-chain diabody, tandem diabodies (TandAbs), Dual-affinity retargeting molecule (DART), DART-Fc, nanobodies, or antibodies produced by the dock-and-lock (DNL) method (Gaowei Fan, Zujian Wang & Mingju Hao, Bispecific antibodies and their applications, 8 JOURNAL OF HEMATOLOGY & ONCOLOGY 130; Dafne Müller & Roland E. Kontermann, Bispecific Antibodies, HANDBOOK OF THERAPEUTIC ANTIBODIES 265-310 (2014), the entire teachings of which are herein incorporated). The methods of producing bsAbs are not limited to quadroma technology based on the somatic fusion of two different hybridoma cell lines, chemical conjugation, which involves chemical cross-linkers, and genetic approaches utilizing recombinant DNA technology. Examples of bsAbs include those disclosed in the following patent applications, which are hereby incorporated by reference: U.S. Ser. No. 12/823,838, filed Jun. 25, 2010; U.S. Ser. No. 13/488,628, filed Jun. 5, 2012; U.S. Ser. No. 14/031,075, filed Sep. 19, 2013; U.S. Ser. No. 14/808,171, filed Jul. 24, 2015; U.S. Ser. No. 15/713,574, filed Sep. 22, 2017; U.S. Ser. No. 15/713,569, field Sep. 22, 2017; U.S. Ser. No. 15/386,453, filed Dec. 21, 2016; U.S. Ser. No. 15/386,443, filed Dec. 21, 2016; U.S. Ser. No. 15/22,343 filed Jul. 29, 2016; and U.S. Ser. No. 15/814,095, filed Nov. 15, 2017.

As used herein "multispecific antibody" refers to an antibody with binding specificities for at least two different antigens. While such molecules normally will only bind two antigens (i.e., bispecific antibodies, bsAbs), antibodies with additional specificities such as trispecific antibody and KIH Trispecific can also be addressed by the system and method disclosed herein.

The term "monoclonal antibody" as used herein is not limited to antibodies produced through hybridoma technology. A monoclonal antibody can be derived from a single clone, including any eukaryotic, prokaryotic, or phage clone, by any means available or known in the art. Monoclonal antibodies useful with the present disclosure can be prepared using a wide variety of techniques known in the art including the use of hybridoma, recombinant, and phage display technologies, or a combination thereof.

In some exemplary embodiments, the protein of interest can be produced from mammalian cells. The mammalian cells can be of human origin or non-human origin can include primary epithelial cells (e.g., keratinocytes, cervical epithelial cells, bronchial epithelial cells, tracheal epithelial cells, kidney epithelial cells and retinal epithelial cells), established cell lines and their strains (e.g., 293 embryonic kidney cells, BHK cells, HeLa cervical epithelial cells and PER-C6 retinal cells, MDBK (NBL-1) cells, 911 cells, CRFK cells, MDCK cells, CHO cells, BeWo cells, Chang cells, Detroit 562 cells, HeLa 229 cells, HeLa S3 cells, Hep-2 cells, KB cells, LSI80 cells, LS174T cells, NCI-H-548 cells, RPMI2650 cells, SW-13 cells, T24 cells, WI-28 VA13, 2RA cells, WISH cells, BS-C-I cells, LLC-MK2 cells, Clone M-3 cells, 1-10 cells, RAG cells, TCMK-1 cells, Y-1 cells, LLC-PKi cells, PK (15) cells, GHi cells, GH3 cells, L2 cells, LLC-RC 256 cells, MHiCi cells, XC cells, MDOK cells, VSW cells, and TH-I, B1 cells, BSC-1 cells, RAf cells, RK-cells, PK-15 cells or derivatives thereof), fibroblast cells from any tissue or organ (including but not limited to heart, liver, kidney, colon, intestines, esophagus, stomach, neural tissue (brain, spinal cord), lung, vascular tissue (artery, vein, capillary), lymphoid tissue (lymph gland, adenoid, tonsil, bone marrow, and blood), spleen, and fibroblast and fibroblast-like cell lines (e.g., CHO cells, TRG-2 cells, IMR-33 cells, Don cells, GHK-21 cells, citrullinemia cells, Dempsey cells, Detroit 551 cells, Detroit 510 cells, Detroit 525 cells, Detroit 529 cells, Detroit 532 cells, Detroit 539 cells, Detroit 548 cells, Detroit 573 cells, HEL 299 cells, IMR-90 cells, MRC-5 cells, WI-38 cells, WI-26 cells, Midi cells, CHO cells, CV-1 cells, COS-1 cells, COS-3 cells, COS-7 cells, Vero cells, DBS-FrhL-2 cells, BALB/3T3 cells, F9 cells, SV-T2 cells, M-MSV-BALB/3T3 cells, K-BALB cells, BLO-11 cells, NOR-10 cells, C3H/IOTI/2 cells, HSDMiC3 cells, KLN205 cells, McCoy cells, Mouse L cells, Strain 2071 (Mouse L) cells, L-M strain (Mouse L) cells, L-MTK' (Mouse L) cells, NCTC clones 2472 and 2555, SCC-PSA1 cells, Swiss/3T3 cells, Indian muntjac cells, SIRC cells, Cn cells, and Jensen cells, Sp2/0, NS0, NS1 cells or derivatives thereof).

As used herein, "sample" can be obtained from any step of the bioprocess, such as cell culture fluid (CCF), harvested cell culture fluid (HCCF), any step in the downstream processing, chromatography eluate, drug substance (DS), or a drug product (DP) comprising the final formulated product. In some other specific exemplary embodiments, the sample can be selected from any step of the downstream process of clarification, chromatographic production, viral inactivation, or filtration. In some specific exemplary embodiments, the drug product can be selected from manufactured drug product in the clinic, shipping, storage, or handling.

In some exemplary embodiments, the sample can be prepared prior to LC-MS analysis. Preparation steps can include alkylation, reduction, denaturation, and/or digestion.

As used herein, the term "protein alkylating agent" refers to an agent used for alkylating certain free amino acid residues in a protein. Non-limiting examples of protein alkylating agents are iodoacetamide (IOA), chloroacetamide (CAA), acrylamide (AA), N-ethylmaleimide (NEM), methyl methanethiosulfonate (MMTS), and 4-vinylpyridine or combinations thereof.

As used herein, "protein denaturing" can refer to a process in which the three-dimensional shape of a molecule is changed from its native state. Protein denaturation can be carried out using a protein denaturing agent. Non-limiting examples of a protein denaturing agent include heat, high or low pH, reducing agents like DTT (see below) or exposure to chaotropic agents. Several chaotropic agents can be used as protein denaturing agents. Chaotropic solutes increase the entropy of the system by interfering with intramolecular interactions mediated by non-covalent forces such as hydrogen bonds, van der Waals forces, and hydrophobic effects. Non-limiting examples for chaotropic agents include butanol, ethanol, guanidinium chloride, lithium perchlorate, lithium acetate, magnesium chloride, phenol, propanol, sodium dodecyl sulfate, thiourea, N-lauroylsarcosine, urea, and salts thereof.

As used herein, the term "protein reducing agent" refers to the agent used for reduction of disulfide bridges in a protein. Non-limiting examples of protein reducing agents used to reduce a protein are dithiothreitol (DTT), β-mercaptoethanol, Ellman's reagent, hydroxylamine hydrochloride, sodium cyanoborohydride, tris(2-carboxyethyl)phosphine hydrochloride (TCEP-HCl), or combinations thereof.

As used herein, the term "digestion" refers to hydrolysis of one or more peptide bonds of a protein. There are several approaches to carrying out digestion of a protein in a sample using an appropriate hydrolyzing agent, for example, enzymatic digestion or non-enzymatic digestion.

As used herein, the term "digestive enzyme" refers to any of a large number of different agents that can perform digestion of a protein. Non-limiting examples of hydrolyzing agents that can carry out enzymatic digestion include protease from *Aspergillus* Saitoi, elastase, subtilisin, protease XIII, pepsin, trypsin, Tryp-N, chymotrypsin, aspergillopepsin I, LysN protease (Lys-N), LysC endoproteinase (Lys-C), endoproteinase Asp-N (Asp-N), endoproteinase Arg-C (Arg-C), endoproteinase Glu-C (Glu-C) or outer membrane protein T (OmpT), immunoglobulin-degrading enzyme of *Streptococcus pyogenes* (IdeS), thermolysin, papain, pronase, V8 protease or biologically active fragments or homologs thereof or combinations thereof. For a recent review discussing the available techniques for protein digestion see Switazar et al., "Protein Digestion: An Overview of the Available Techniques and Recent Developments" (Linda Switzar, Martin Giera & Wilfried M. A. Niessen, Protein Digestion: An Overview of the Available Techniques and Recent Developments, 12 JOURNAL OF PROTEOME RESEARCH 1067-1077 (2013)).

In some exemplary embodiments, a sample can be enriched for HCPs using a probe, for example an activity-based protein profiling (ABPP) probe. A probe can comprise a tag, for example a fluorescent tag or an affinity tag; a warhead ("reactive moiety" or "functionalized small molecule"), capable of chemically reacting with the active site of an enzyme; and a linker connecting the tag and the warhead.

A tag can be a reporter tag for detection and identification of the labelled enzyme, such as direct molecular imaging or radiolabeling. For example, the tag can be a fluorophore, such as rhodamine, for visualization. A tag can be an affinity tag for enrichment or purification, such as biotin or a variant thereof. A tag can be a labelling tag, such as azides or acetylenes, for in vivo or in situ labeling of proteins. A tag can comprise, for example, rhodamine, biotin, desthiobiotin, phosphine, alkyne, azide, acetylene, cyclooctyne, phenyl azide, or omega-terminal azide.

The linker serves as a connector for connecting the warhead and the tag. The linker can serve as a spacer between the warhead and the tag, including a flexible chain with various possible lengths and hydrophobicities. In some exemplary embodiments, the linker can be derived from polyethylene glycol (PEG).

A warhead can comprise, for example, fluorophosphonate, epoxysuccinate, N-acetylated amino acid, quinolimine methide coupled amino acid, or p-aminomandelic acid coupled amino acid.

In some exemplary embodiments, a probe can additionally comprise a tail connected to the warhead. In some exemplary embodiments, a tail can be a fatty acyl tail. In some exemplary embodiments, a fatty acyl tail can be a 16-carbon fatty acid chain and can function to mimic the structure of polysorbate.

In some exemplary embodiments, a probe can comprise a biotin tag, a linker derived from PEG, a fluorophosphonate warhead, and a fatty acyl tail. In some exemplary embodiments, a probe can have the structure shown in FIG. 4B.

Since proteins in the same enzymatic family have similar functions, the active sites of these proteins commonly have similar structures, therefore an active site-directed probe can be reactive to the active sites of many members of a given enzymatic family. In some exemplary embodiments, serine hydrolase probes are used to label, assay, purify or detect enzymatic HCP impurities which have serine hydrolase activities. Serine hydrolase enzymes are a large class of enzymes that include cholinesterases, hydrolases, lipases, and proteases. In one aspect, the serine hydrolase probe has a fluorophosphonate group that covalently modifies the active sites of serine hydrolases. Serine hydrolases can be specifically and sensitively covalently modified by the probe.

As used herein, the term "host cell proteins" (HCP) includes protein derived from a host cell and can be unrelated to the desired protein of interest. Host cell proteins can be a process-related impurity which can be derived from the manufacturing process and can include three major categories: cell substrate-derived, cell culture-derived and downstream-derived. Cell substrate-derived impurities include, but are not limited to, proteins derived from a host organism and nucleic acid (host cell genomic, vector, or total DNA). Cell culture-derived impurities include, but are not limited to, inducers, antibiotics, serum, and other media components. Downstream-derived impurities include, but are not limited to, enzymes, chemical and biochemical processing reagents (e.g., cyanogen bromide, guanidine, oxidizing and reducing agents), inorganic salts (e.g., heavy metals, arsenic, nonmetallic ion), solvents, carriers, ligands (e.g., monoclonal antibodies), and other leachables. In some exemplary embodiments, an HCP can be a protease, lipase, peptidase, esterase, and/or hydrolase. In some exemplary embodiments, an HCP can include a cysteine protease active site, a serine protease active site, a serine hydrolase active site, a cathepsin active site, a metalloprotease active site, a cholinesterase active site, a lipase active site, a protease active site, a hydrolase active site, an oxidoreductase active site, or an isomerase active site. In some exemplary embodiments, an HCP can preferentially bind to polysorbate or molecules with a structure similar to polysorbate.

In some exemplary embodiments, one or more HCPs can be enriched from a protein sample by incubating the sample with an ABPP probe to form a mixture. An ABPP probe will chemically react with the active site of a target HCP enzyme to form a captured host cell protein. The captured host cell protein can be subjected to, for example, digestion, reduction, denaturation and/or alkylation. The captured HCP can be contacted to a solid substrate, for example agarose beads or magnetic beads, comprising a capture reagent capable of binding to the ABPP probe tag, for example avidin, streptavidin, alkyne or azide, to form a substrate-bound HCP. The solid substrate bound to the captured HCP enzyme can then be isolated or precipitated to separate it out of the mixture, for example using centrifugation. The solid substrate bound to the captured HCP enzyme can be further processed after being isolated, for example, by contacting it to a digestive enzyme, which produces peptide fragments of the HCP enzyme. Peptide fragments can be subjected to filtration and subjected to LC-MS analysis to characterize the HCP enzyme.

As used herein, the term "liquid chromatography" refers to a process in which a biological/chemical mixture carried by a liquid can be separated into components as a result of differential distribution of the components as they flow through (or into) a stationary liquid or solid phase. Non-limiting examples of liquid chromatography include reverse phase liquid chromatography, ion-exchange chromatography, size exclusion chromatography, affinity chromatography, hydrophobic interaction chromatography, hydrophilic interaction chromatography, or mixed-mode chromatography. In some aspects, a sample containing at least one HCP can be subjected to any one of the aforementioned chromatographic methods or a combination thereof.

The protein load of a sample comprising a protein of interest can be adjusted to a total protein load to the column of between about 50 g/L and about 1000 g/L; about 5 g/L and about 150 g/L, between about 10 g/L and about 100 g/L, between about 20 g/L and about 80 g/L, between about 30 g/L and about 50 g/L, or between about 40 g/L and about 50 g/L. In certain embodiments, the protein concentration of the load protein mixture is adjusted to a protein concentration of the material to be loaded onto the column of between about 0.5 g/L and about 50 g/L, or between about 1 g/L and about 20 g/L.

As used herein, the term "mass spectrometer" includes a device capable of identifying specific molecular species and measuring their accurate masses. The term is meant to include any molecular detector into which a polypeptide or peptide may be characterized. A mass spectrometer can include three major parts: the ion source, the mass analyzer, and the detector. The role of the ion source is to create gas phase ions. Analyte atoms, molecules, or clusters can be transferred into gas phase and ionized either concurrently (as in electrospray ionization) or through separate processes. The choice of ion source depends on the application. In some exemplary embodiments, the mass spectrometer can be a tandem mass spectrometer. As used herein, the term "tandem mass spectrometry" includes a technique where structural information on sample molecules is obtained by using multiple stages of mass selection and mass separation. A prerequisite is that the sample molecules be transformed into a gas phase and ionized so that fragments are formed in a predictable and controllable fashion after the first mass selection step. MS/MS, or $MS^2$, can be performed by first selecting and isolating a precursor ion ($MS^1$), and further fragmenting it. Tandem MS has been successfully performed with a wide variety of analyzer combinations. Which analyzers to combine for a certain application can be determined by many different factors, such as sensitivity, selectivity, and speed, but also size, cost, and availability. The two major categories of tandem MS methods are tandem-in-space and tandem-in-time, but there are also hybrids where tandem-in-time analyzers are coupled in space or with tandem-in-space analyzers. A tandem-in-space mass spectrometer comprises an ion source, a precursor ion activation device, and at least two non-trapping mass analyzers. Specific m/z separation functions can be designed so that in one section of the instrument ions are selected, dissociated in an intermediate region, and the product ions are then transmitted to another analyzer for m/z separation and data acquisition. In tandem-in-time, mass spectrometer ions produced in the ion source can be trapped, isolated, fragmented, and m/z separated in the same physical device. The peptides identified by the mass spectrometer can be used as surrogate representatives of the intact protein and their post translational modifications. They can be used for protein characterization by correlating experimental and theoretical MS/MS data, the latter generated from possible peptides in a protein sequence database. The characterization includes, but is not limited to, sequencing amino acids of the protein fragments, determining protein sequencing, determining protein de novo sequencing, locating post-translational modifications, or identifying post translational modifications, or comparability analysis, or combinations thereof.

In some exemplary aspects, the mass spectrometer can work on nanoelectrospray or nanospray.

The term "nanoelectrospray" or "nanospray" as used herein refers to electrospray ionization at a very low solvent flow rate, typically hundreds of nanoliters per minute of sample solution or lower, often without the use of an external solvent delivery. The electrospray infusion setup forming a nanoelectrospray can use a static nanoelectrospray emitter or a dynamic nanoelectrospray emitter. A static nanoelectrospray emitter performs a continuous analysis of small sample (analyte) solution volumes over an extended period of time. A dynamic nanoelectrospray emitter uses a capillary column and a solvent delivery system to perform chromatographic separations on mixtures prior to analysis by the mass spectrometer.

In some exemplary embodiments, a mass spectrometer is coupled to a chromatography system.

As used herein, the term "database" refers to a compiled collection of protein sequences that can possibly exist in a sample, for example in the form of a file in a FASTA format. Relevant protein sequences can be derived from cDNA sequences of a species being studied. Public databases that can be used to search for relevant protein sequences included databases hosted by, for example, Uniprot or Swiss-prot. Databases can be searched using what are herein referred to as "bioinformatics tools." Bioinformatics tools provide the capacity to search uninterpreted MS/MS spectra against all possible sequences in the database(s), and provide interpreted (annotated) MS/MS spectra as an output. Non-limiting examples of such tools are Mascot (www.matrixscience.com), Spectrum Mill (www.chem.agilent.com), PLGS (www.waters.com), PEAKS (www.bioinformaticssolutions.com), Proteinpilot (download.appliedbiosystems.com//proteinpilot), Phenyx (www.phenyx-ms.com), Sorcerer (www.sagenresearch.com), OMS SA (www.pubchem.ncbi.nlm.nih.gov/omssa/), X!Tandem (www.thegpm.org/TANDEM/), Protein Prospector (prospector.ucsfedu/prospector/mshome.htm), Byonic (www.proteinmetrics.com/products/byonic), Proteome Discoverer (https://www.thermofisher.com/order/catalog/product/OPTON-30945#/OPTON-30945), or Sequest (fields.scripps.edu/sequest).

In one embodiment, this disclosure provides a novel probe for activity-based protein profiling. A novel probe of the present invention includes a warhead, a linker, a tag, and a fatty acyl chain, which provide a mechanism for capturing an enzyme and a structure similar to the structure of polysorbate. The novel probe can be used to enrich a sample for lipases, serine hydrolase enzymes, or any molecule that binds to polysorbate. A suitable sample can be any sample including at least one molecule comprising a serine hydrolase active site or a polysorbate binding site. A molecule captured by the novel probe can be, for example, a host cell protein, a recombinant serine hydrolase enzyme, a recombinant polysorbate-binding protein, or a polysorbate-binding small molecule.

An enriched sample can be subjected to analysis for identification, quantification, and/or characterization of a captured molecule. Said analysis can be conducted by, for example, liquid chromatography, mass spectrometry, electrophoresis (for example, gel electrophoresis or capillary electrophoresis), immunoassay (for example, ELISA), or any technique for analysis of a protein or biological molecule known in the art. The results of said analysis can be used, for example, to characterize a sample, optimize a production process, conduct quality assurance, identify a contaminant, identify a source of product instability, identify a source of polysorbate degradation, and/or identify a source of enzymatic activity.

Alternatively, or additionally, in one embodiment, a novel probe of the present invention can be used to deplete a captured molecule from a sample, for example by removing the probe-captured molecule complex from a sample using a solid substrate capable of binding to the tag of the probe, yielding a purified sample. In this case, the captured molecule can be subjected to further analysis.

in one embodiment, this disclosure provides a method for characterizing a molecule in a sample. In some embodiments, the method comprises (a) contacting a sample comprising a molecule to a probe to form a captured molecule, wherein said molecule is a lipase, a serine hydrolase enzyme, a host cell protein, a recombinant protein, or a polysorbate-binding molecule, wherein said probe comprises a tag, a linker covalently coupled to said tag, a warhead covalently coupled to said linker, and a tail including a fatty acyl chain, said tail covalently coupled to said warhead, wherein said warhead is capable of chemically reacting with said molecule and said tag allows for capture and/or detection of said molecule; (b) contacting said captured molecule to a solid substrate, wherein said solid substrate is capable of binding to the tag of said probe, to form a substrate-bound molecule; (c) isolating said substrate-bound molecule; and (d) subjecting said substrate-bound molecule to analysis to characterize said molecule.

In one embodiment, this disclosure provides a method for depleting a molecule from a sample. In some embodiments, the method comprises (a) contacting a sample comprising a molecule to a probe to form a captured molecule, wherein said molecule is a lipase, a serine hydrolase enzyme, a host cell protein, a recombinant protein, or a polysorbate-binding molecule, wherein said probe comprises a tag, a linker covalently coupled to said tag, a warhead covalently coupled to said linker, and a tail including a fatty acyl chain, said tail covalently coupled to said warhead, wherein said warhead is capable of chemically reacting with said molecule and said tag allows for capture and/or detection of said molecule; (b) contacting said captured molecule to a solid substrate, wherein said solid substrate is capable of binding to the tag of said probe, to form a substrate-bound molecule; and (c) isolating said substrate-bound molecule to deplete said molecule from said sample.

It is understood that the present invention is not limited to any of the aforesaid protein(s), antibody(s), protein alkylating agent(s), protein denaturing agent(s), protein reducing agent(s), digestive enzyme(s), hydrolyzing agent(s), sample(s), probe(s), tag(s), linker(s), warhead(s), HCP(s), chromatography system(s), mass spectrometer(s), database(s), or bioinformatics tool(s), and protein(s), antibody(s), protein alkylating agent(s), protein denaturing agent(s), protein reducing agent(s), digestive enzyme(s), hydrolyzing agent(s), sample(s), probe(s), tag(s), linker(s), warhead(s), HCP(s), chromatography system(s), mass spectrometer(s), database(s), or bioinformatics tool(s) can be selected by any suitable means.

The present invention will be more fully understood by reference to the following Examples. They should not, however, be construed as limiting the scope of the invention.

EXAMPLES

Materials. Amino-Peg$_6$-alcohol was purchased from BroadPharm (San Diego, CA). LC-MS-grade water, acetonitrile, and formic acid were purchased from Fisher Scientific. FP-biotin was purchased from MuseChem (Fairfield, NJ). FP-desthiobiotin, high-capacity streptavidin agarose, ExpiCHO-S cells, and ExpiCHO medium were purchased from Thermo Fisher Scientific (Waltham, MA). Sequence-grade modified trypsin was purchased from Promega (Madison, WI). Nanosep centrifuge devices were purchased from Pall Corporation (Port Washington, NY). Waters XBridge Premier BEH C18 column and Waters Acquity UPLC BEH C18 column were purchased from Waters (Milford, MA). Nano C18 integrated columns (1.7 μm, 75 μm×25 μm) were purchased from CoAnn Technology (Richland, WA). Recombinant human PLA2G7 and recombinant human LPL were purchased from R&D Systems (Minneapolis, MN). Recombinant CHO LAL and the drug substance (DS) used for the spiking experiment were generated in-house. All other reagents were obtained from Sigma-Aldrich (St. Louis, MO).

Figure 7A:
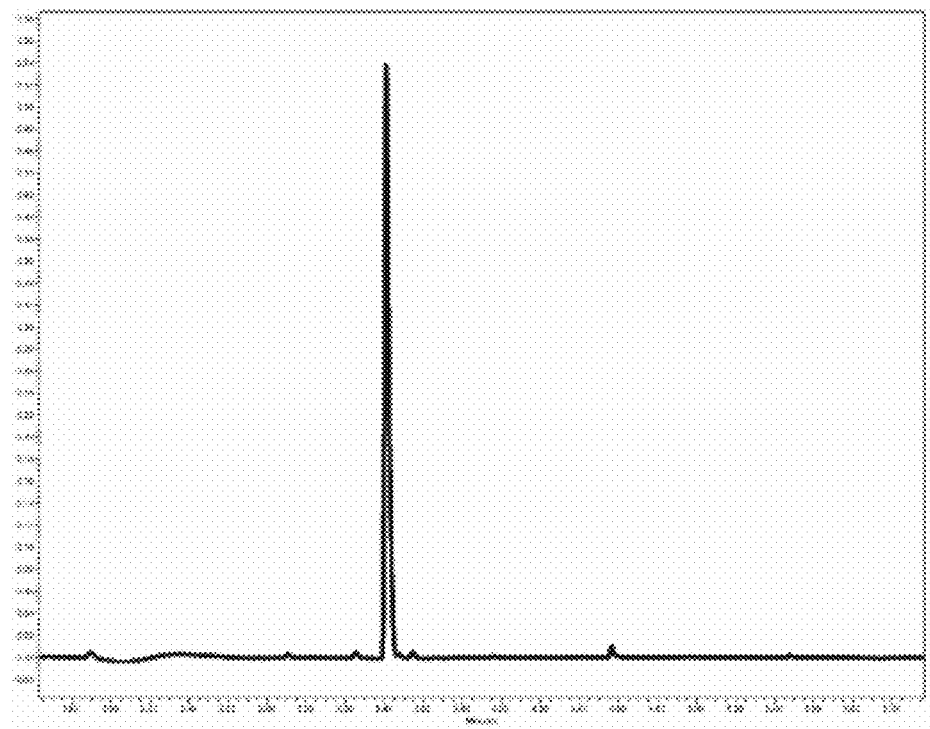
FIG. 7A shows a UV chromatogram of biotin-PEG$_6$-alcohol, according to an exemplary embodiment.
Figure 7B:
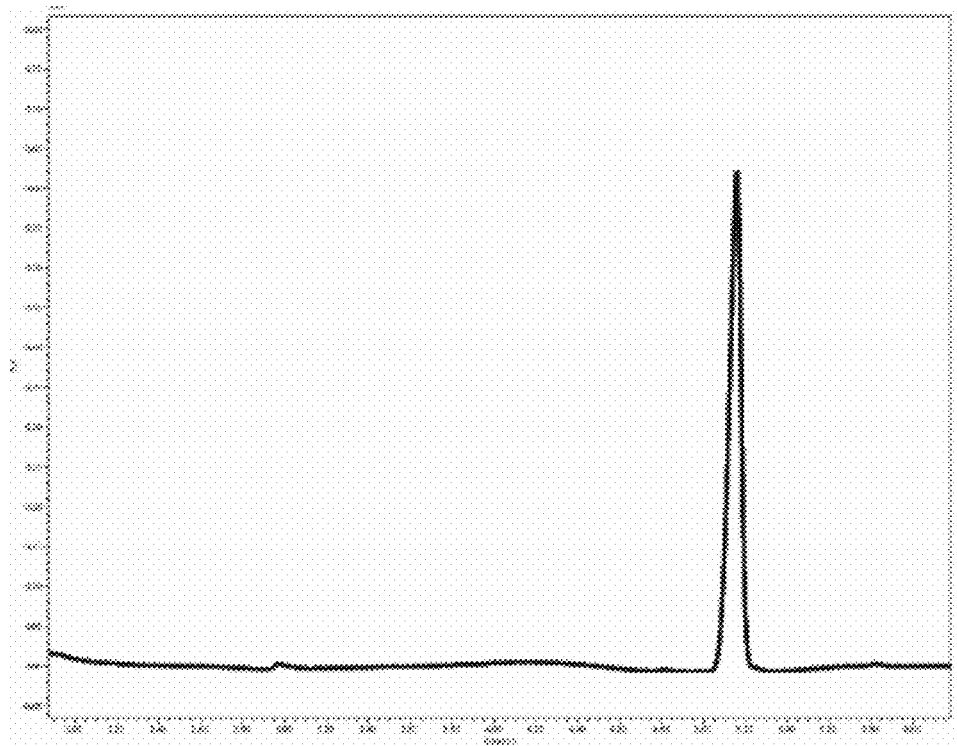
FIG. 7B shows a UV chromatogram of a novel probe, according to an exemplary embodiment.
Figure 7C:
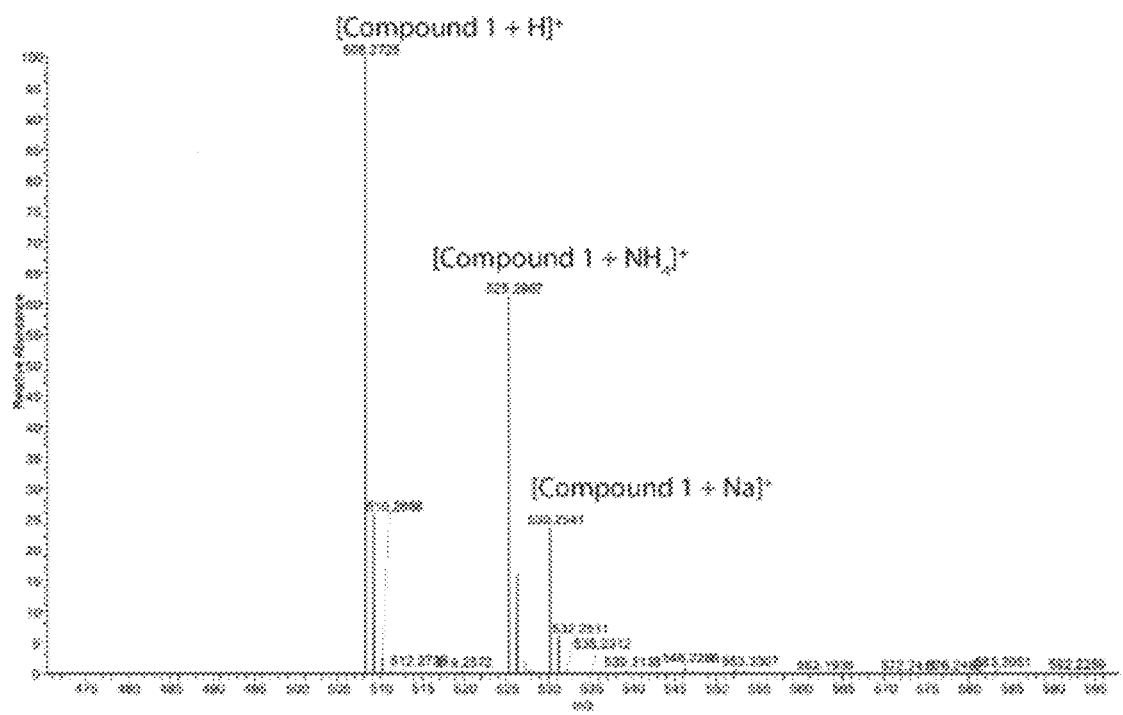
FIG. 7C shows a MS1 mass spectrum of biotin-PEG$_6$-alcohol, according to an exemplary embodiment.

Synthesis and purification of a novel ABPP probe. To synthesize a novel ABPP probe of the present invention, 37 mg 0.15 mmol biotin, 28 mg 0.1 mmol amino-PEG$_6$-alcohol, 38 mg 0.2 mmol N-(3-Dimethylaminopropyl)-N'-ethylcarbodiimide hydrochloride (EDC HCl), and 0.7 mg 0.005 mmol 1-Hydroxybenzotriazole hydrate (HOBt) were mixed with 5 mL acetonitrile and 5 mL water. The mixture was stirred at room temperature overnight. After overnight incubation, the resulting biotin-PEG$_6$-alcohol was purified by C18 column chromatography, eluted with water/acetonitrile. The eluent was dried by vacuum, which yielded biotin-PEG$_6$-alcohol as a white gel (42 mg, 84% yield). The identity of biotin-PEG$_6$-alcohol was confirmed by mass spectrometry analysis. The measured m/z is 508.572 for proton adduct and the calculated m/z is 508.270, as shown in FIG. 7C. The purity of biotin-PEG$_6$-alcohol was confirmed to be more than 95% by LC-UV, as shown in FIG. 7A.

45 mg 0.1 mmol hexadecylphosphonic acid (306 g/mol) was added to 2 mL dichloromethane. The mixture was cooled on ice. 26 μL 0.2 mmol (diethylamino)sulfur trifluoride (DAST) (161 g/mol, 1.22 g/mL) was added. The mixture was stirred on ice for 10 minutes and then at room temperature for 15 minutes. The reaction was quenched with 1 mL ice cold 0.5 M HCl. The organic layer was collected by glass pipette and washed with 1 mL water. MgSO$_4$ was added to absorb water. MgSO$_4$ was filtered out and the resulting solvent was dried by a stream of nitrogen. Hexadecyldifluorophosphonate was obtained as a waxy yellowish solid. The product was dissolved in 500 μL dichloromethane.

Figure 7D:
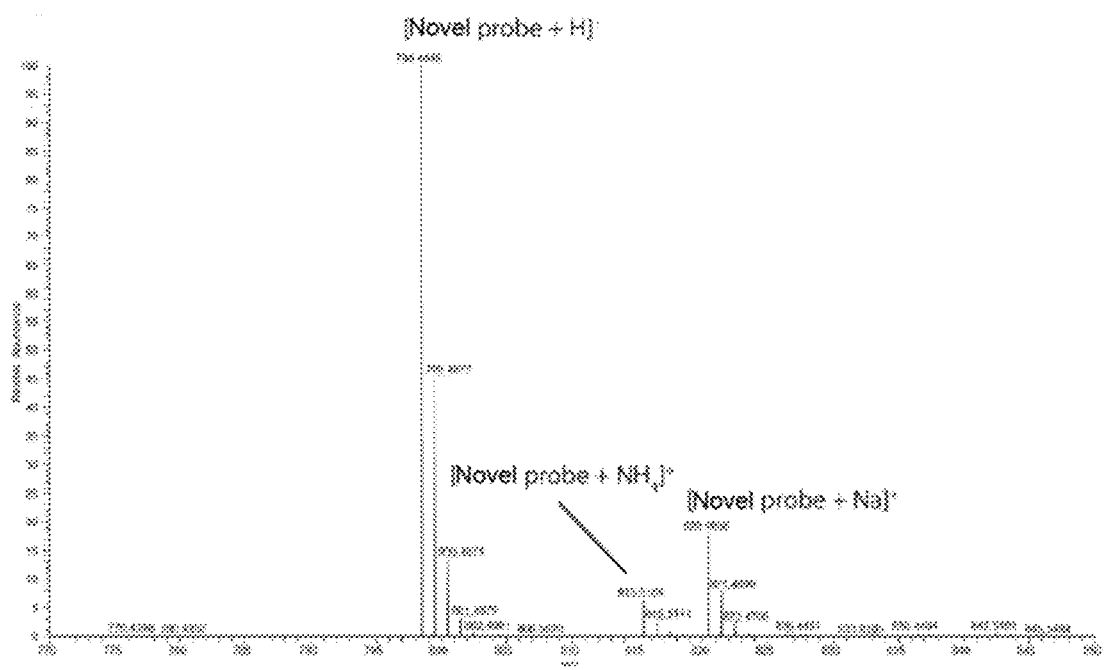
FIG. 7D shows a MS1 mass spectrum of a novel probe, according to an exemplary embodiment.

50 mg 0.1 mmol biotin-PEG$_6$-alcohol (507 g/mol), and 18 μL 0.1 mmol diisopropylethylamine were dissolved in 1 mL dichloromethane. 300 mg 4 Å molecular sieves was added and stirred at room temperature for 1 hour. All of the hexadecyldifluorophosphonate solvent obtained from the previous step was added and the mixture was incubated at 45° C. overnight. After overnight incubation, 20 μL formic acid was added. The molecular sieves were filtered out by a cotton plug, and the filtrate was dried by a stream of nitrogen. The crude product was dissolved in acetonitrile containing 1% formic acid and purified by C18 high-performance liquid chromatography (HPLC), eluted by water/acetonitrile with 0.1% formic acid. After the eluent was dried by vacuum, the ABPP probe was obtained as a white solid (31 mg, 39% yield for two steps). The identity of the probe was confirmed by mass spectrometry analysis. The measured m/z is 798.4846 for proton adduct and the calculated m/z is 798.4863, as shown in FIG. 7D. The purity of the probe was confirmed to be more than 98% by LC-UV, as shown in FIG. 7B.

A Waters XBridge Premier BEH C18 column (130 Å, 2.5 μm, 4.6 mm×150 mm) was used for HPLC purification of a novel probe of the present invention. Solvent A was water with 0.1% formic acid, and solvent B was acetonitrile with 0.1% formic acid. A linear gradient with an increasing percentage of solvent B was used. The product was eluted at approximately 95% solvent B. The fraction containing the product was collected, dried by speed-vacuum, dissolved in DMSO, and stored at −80° C.

Serine hydrolase labelling and purification. ExpiCHO-S cells were cultured in the ExpiCHO expression medium following the manufacturer's guidelines. The cells were collected by centrifugation at 300 g for 5 minutes. The cell pellet was resuspended in phosphate-buffered saline and homogenized by a Dounce tissue grinder (pestle clearance 0.001-0.003 inches, 15 strokes). The resulting mixture was centrifuged at 18000 g for 30 minutes in a refrigerated centrifuge. The supernatant was collected, and the protein concentration was measured by the Bradford protein assay. The resulting ExpiCHO-S null cell lysate was used for subsequent ABPP analysis.

The ExpiCHO-S null cell lysate was diluted by ABPP binding buffer (0.1 M sodium phosphate, 0.15 M NaCl, pH 7.3) to a final concentration of 10 mg/mL or 2.5 mg/mL. 0.4 mL of sample was transferred to a 2 mL tube and DMSO solution of the synthesized probe was added to a final concentration of 1 μM or 2 μM. The sample was incubated at room temperature for 1 hour. After incubation, 1.6 mL cold methanol/acetone 1:1 was added. The sample was incubated at −20° C. for 30 minutes, and centrifuged for 10 minutes, 14000 g, at 4° C. The solvent was removed, and the protein pellet was dried in air for 2 minutes. 1 mL of resuspension buffer (1% SDS, 1 M urea, 50 mM Tris pH 8.0) was added. The sample was then incubated on a thermomixer at 37° C. and 1000 rpm.

After a 1 hour incubation, the protein pellet was completely dissolved. 50 μL streptavidin agarose was added and the sample was incubated at room temperature on a rotator for 1 hour. The agarose was then washed twice with 0.1% SDS, 1 M urea, 50 mM Tris pH 8.0; washed four times with 1 M urea, 50 mM Tris pH 8.0; and washed once with 50 mM Tris pH 8.0. The agarose was precipitated by centrifugation at 1000 g for 2 minutes between washes. After the final wash, the agarose was resuspended in 200 μL 50 mM Tris pH 8.0. 0.5 μg sequence grade modified trypsin was added and the sample was digested at 37° C. overnight. After overnight digestion, the digested sample was reduced by 5 mM tris(2-carboxyethyl) phosphine (TCEP) for 5 minutes at 90° C., and then filtered by a Nanosep 10K filter at 14000 g for 10 minutes. The filtrate was dried by SpeedVac and dissolved in 50 μL 0.5% formic acid in water. The peptide concentration was estimated by Nanodrop, and 1 μg peptide was injected for nanoLC-MS analysis, using data-dependent LC-MS/MS.

Analysis of ABPP probe detection limits. Drug substance (DS) was used as the background protein. This DS had been previously analyzed for host cell proteins by various sensitive methods, and no lipase was detected. The HCP analysis methods used include pro-A depletion and ultralow trypsin digestion. The DS was diluted by the ABPP binding buffer to 10 mg/mL. Recombinant human PLA2G7, recombinant human LPL, and recombinant CHO LAL were spiked into diluted DS at the indicated concentrations. The probe binding and following steps were performed as described above.

Recombinant human LPL labeling by a novel probe. First, 10 µg of recombinant human LPL was diluted by ABPP binding buffer to 200 µg/mL. A probe of the present invention was added to a concentration of 1 µM. The sample was incubated for 1 hour in a thermomixer at 25° C., 650 rpm. After incubation, 8 M of urea and 5 mM of TCEP were added. The sample was denatured and reduced for 30 minutes at 50° C. After denaturation and reduction, the sample was diluted by 10 volumes of 50 mM Tris buffer, pH 8.0. Next, 0.5 µg of trypsin was added, and the sample was digested overnight at 37° C. After overnight incubation, the digestion was quenched by adding 0.2% formic acid, and the sample was ready for nano LC-MS/MS analysis.

LC-MS/MS Analysis. LC-MS/MS analysis of a novel probe of the present invention was performed on a Water Acquity UPLC system coupled to a Q Exactive Plus mass spectrometer. A novel probe of the present invention was dissolved in acetonitrile containing 0.1% formic acid at a concentration of 10 µg/mL. A 1 µL sample was injected into a Waters Acquity UPLC BEH C18 column (130 Å, 1.7 µm, 2.1 mm×100 mm) and separated by a linear gradient with a flow rate of 0.25 mL/minute: 0 minutes, 5% B; 30 minutes, 95% B; 35 minutes, 95% B; 35.1 minutes, 5% B; and 40 minutes, 5% B. The MS1 scan was performed with a resolution of 70,000. The spray voltage of the electrospray ionization source was 3.8 kV. The sheath gas flow rate was 40 (arbitrary units). The capillary temperature was 350° C. For tandem mass spectrometry analysis, the HCD collisional energy was 20%, and the MS2 scan was performed with a resolution of 17,500.

The nano LC-MS/MS analysis of the ABPP-enriched samples was performed on an UltiMate 3000 RSLCnano LC system coupled to an Orbitrap Fusion Lumos Tribrid mass spectrometer. A C18 integrated column from CoAnn Technology (1.7 µm, 75 µm×25 cm) was used to separate the peptide digest. Mobile phase A was water with 0.1% formic acid, and mobile phase B was 80% acetonitrile, 20% water, with 0.08% formic acid. A linear gradient was used with a flow rate of 0.25 µL/minute: 0 minutes, 4% B; 10 minutes, 4% B; 80 minutes, 38% B; 81 minutes, 95% B; 100 minutes, 95% B; 101 minutes, 4% B; and 125 minutes, 4% B. The nano ESI spray voltage was set to 2.1 kV. Mass scans were performed in a data-dependent acquisition (DDA) mode, and a survey scan was performed in the Orbitrap with a cycle time of 2 seconds. The MS1 scan was set to an Orbitrap resolution of 120,000, a scan range of 350-2000, and a maximum injection time of 25 ms with a standard AGC target. The data-dependent MS2 scan was performed using HCD fragmentation with a 30% collisional energy, a 30,000 Orbitrap resolution, a standard AGC target, and a 50 ms maximum injection time. The duration of dynamic exclusion was set to 30 seconds, and only peptides with charge states 2-7 were analyzed.

The nano LC-MS/MS analysis of the labeled human recombinant LPL was performed using settings similar to those for the ABPP samples. A stronger solvent B (75:20:5 acetonitrile:isopropanol:water with 0.1% formic acid) was used to elute the probe-labeled peptide.

Proteomics data processing. The HCP analysis data were processed using Proteome Discoverer 2.2 with the SEQUEST algorithm. The search was performed against the *cricetulus griseus* (Chinese hamster) proteome database from Uniprot (UP000694386). Trypsin was chosen as the enzyme for digestion, and the maximum missed cleavage site was set to 1. The minimum peptide length was 4, with a maximum of 150. The precursor mass tolerance was set to 20 ppm, and the fragment mass tolerance was set to 0.02 Da. Methionine oxidation (+15.995 Da) was set as a dynamic modification. Data filter criteria were set as 1% FDR for peptide identification and 5% FDR for protein identification, with a minimum of two unique peptides detected per protein.

Example 1. Design of the Novel ABPP Probes

ABPP has proven to be an effective tool for detecting lipases that can potentially catalyze the degradation of polysorbate in biotherapeutics. The reactive binding group in an ABPP probe can covalently label the nucleophilic active site of enzymes, while the probe structure is critical for ensuring the labeling efficiency and selectivity of the ABPP method. Base on the structure of polysorbate 80, as shown in FIG. 8B, a novel ABPP probe was designed and synthesized composed of, in one exemplary embodiment, a hydrophobic 16-carbon fatty acyl tail, a fluorophosphonate reactive binding group, a hydrophilic $PEG_6$ linker, and a biotin affinity tag.

Figure 8A:
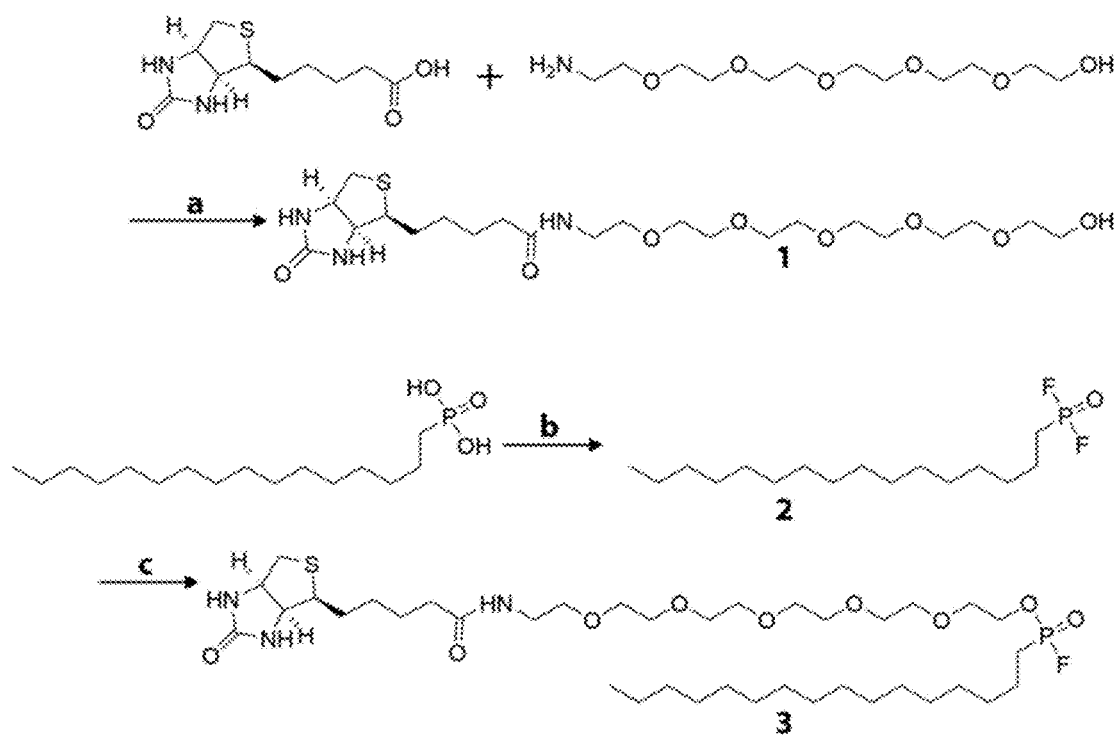
FIG. 8A shows a synthesis of a novel probe, according to an exemplary embodiment.
Figure 8B:
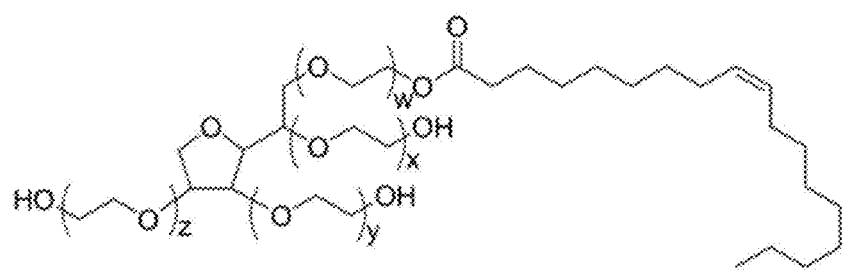
FIG. 8B shows a structure of polysorbate 80 (PS80), in which x+y+z+w=20, according to an exemplary embodiment.
Figure 8C:
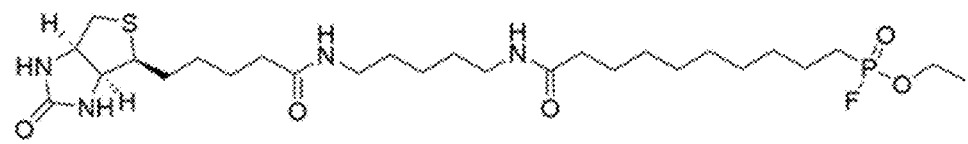
FIG. 8C shows a structure of the commercial ABPP probe FP-biotin, according to an exemplary embodiment.
Figure 8D:
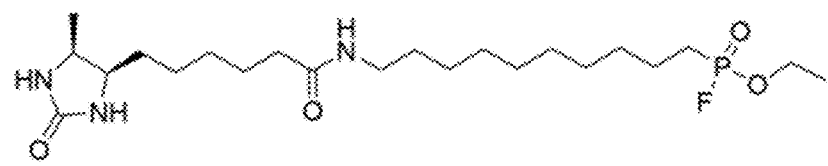
FIG. 8D shows a structure of the commercial ABPP probe FP-desthiobiotin, according to an exemplary embodiment.

To synthesize a novel probe of the present invention, first biotin was conjugated to a bifunctional PEG linker catalyzed by 1-ethyl-3-(3-dimethylaminopropyl) carbodiimide (EDC) and hydroxybenzotriazole (HOBt) (FIG. 8A, reaction a), which afforded biotin-$PEG_6$-alcohol (FIG. 8A, compound 1). Next, the phosphonate group of commercially available hexadecylphosphonic acid was fluorinated by diethylaminosulfur trifluoride (DAST) (FIG. 8A, reaction b), resulting in hexadecylfluorophosphonate (FIG. 8A, compound 2). To attach the biotin-$PEG_6$-alcohol to hexadecylfluorophosphonate, the two components were incubated together in the presence of diisoproylethylamine and 4 Å molecular sieves (FIG. 8A, reaction c), which yielded the final product (FIG. 8A, compound 3). After purification by reversed-phase HPLC and solvent evaporation by vacuum, the final product was obtained as a white powder.

Figure 7E:
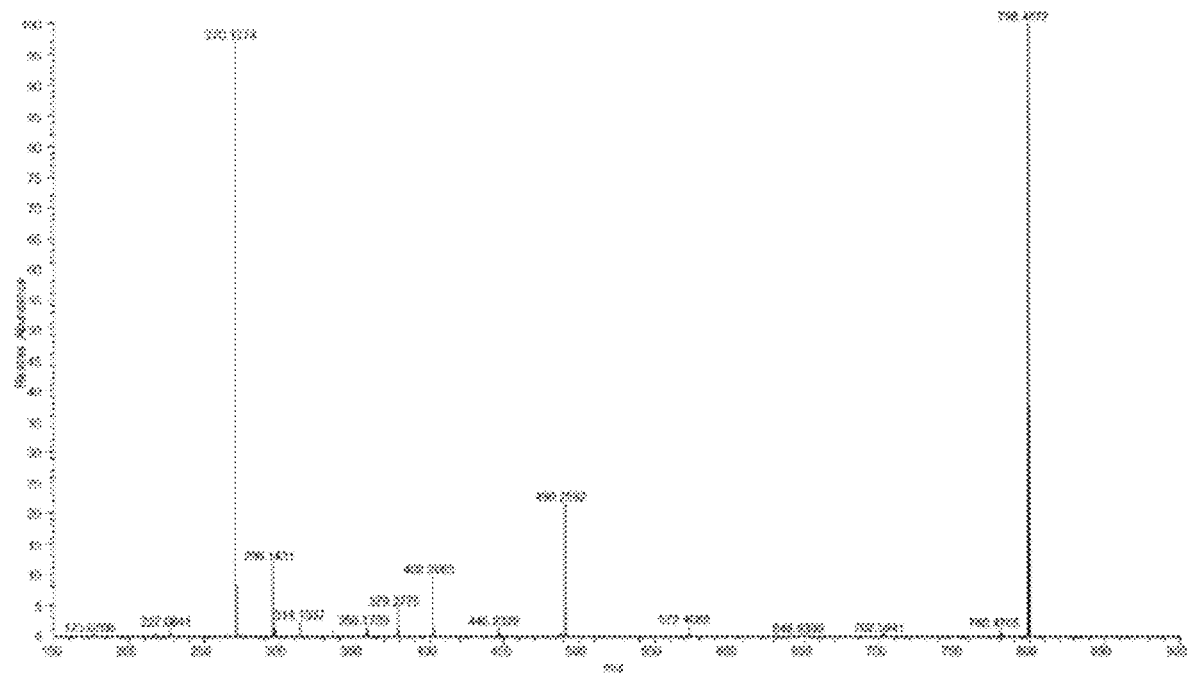
FIG. 7E shows a MS2 mass spectrum of a novel probe, according to an exemplary embodiment.
Figure 7F:
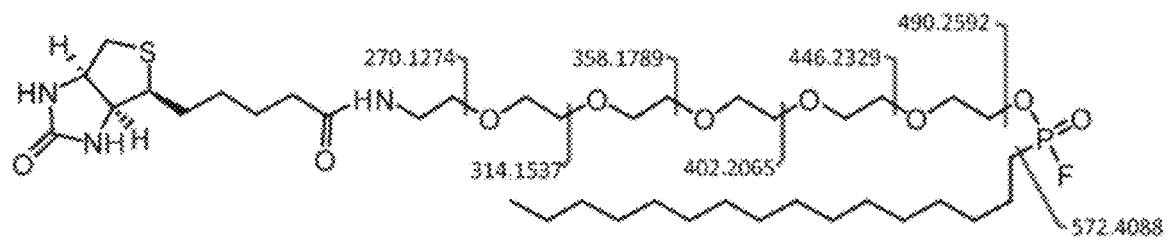
FIG. 7F shows a fragmentation pattern of a novel probe, according to an exemplary embodiment.

Mass spectrometric analyses were performed to substantiate the identity of the final product. As shown in FIG. 7D, the MS1 spectrum of a novel probe of the present invention demonstrates a predominant peak with an m/z of 798.4846, corresponding to the proton adduct of the novel probe (calculated m/z=798.4863, Δ=2 ppm). The other two peaks with m/z of 815.5104 and 820.4658 are the ammonium and sodium adducts of the novel probe, respectively. In the MS2 spectrum of the parent ion 798.4846 (FIG. 7E), a series of daughter ions with a mass difference of 44 were observed, including 270.1274, 314.1537, and 490.2592. These daughter ions are formed because of the serial fragmentation of the $PEG_6$ linker. The fragmentation pattern is summarized in FIG. 7F, demonstrating that the fragments observed are consistent with the structure of the novel probe.

In some exemplary embodiments, novel ABPP probes disclosed herein comprise a biotin tag for affinity purification, a fluorophosphonate reactive group to capture the serine hydrolase active sites of HCP enzymes, and a PEG-derived linker and fatty acyl tail that structurally mimic polysorbate. Compared to commercially available serine hydrolase probes, the structure of the novel ABPP probes allow for more sensitivity and selectivity in capturing HCP lipases that hydrolyze polysorbate, because of the superior similarity to polysorbate, as shown for one exemplary embodiment in FIG. 4.

Example 2. Effectiveness of the Novel ABPP Probes

To increase the specificity and affinity to active enzymes that can potentially hydrolyze polysorbate, the novel probes were designed to mimic the structure of polysorbate, which contains hydrophilic PEG linkers and hydrophobic fatty acyl tail(s), as described above. The effectiveness of the novel ABPP probes of the present invention were validated using a wildtype ("null") CHO cell lysate. A CHO cell lysate without any additional processing comprises a complex sample with thousands of HCPs, and with serine hydrolase lipases of interest in relatively low abundance, presenting a significant challenge to lipase detection.

Figure 6A:
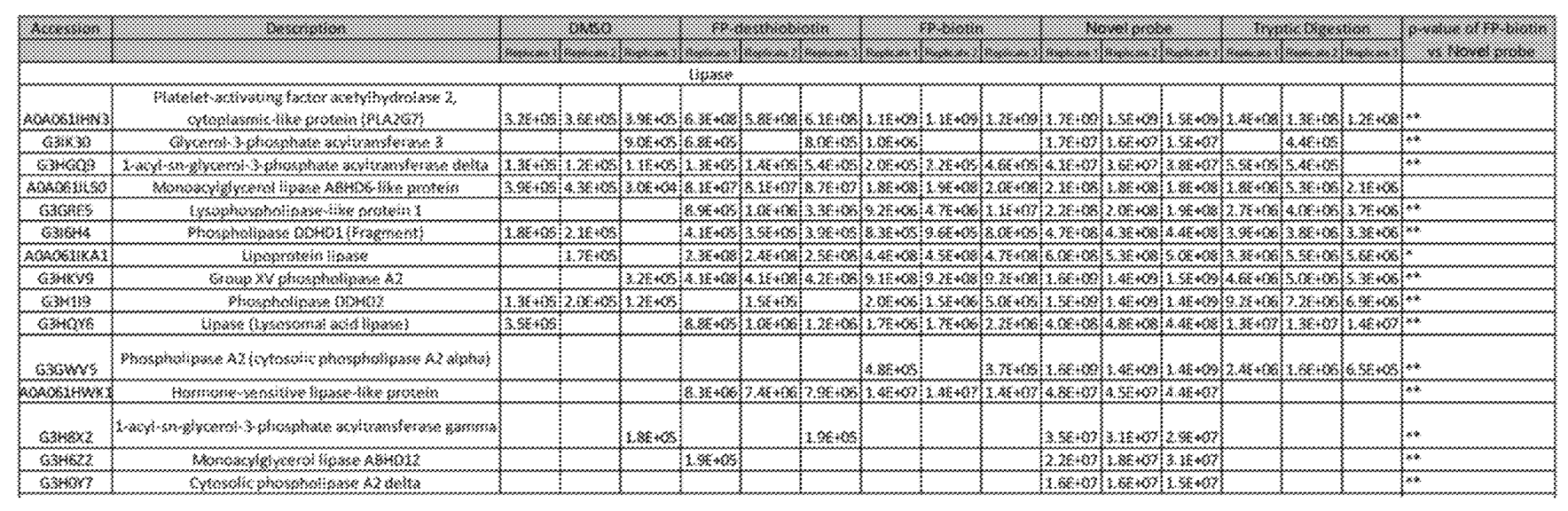
Figure 6B:
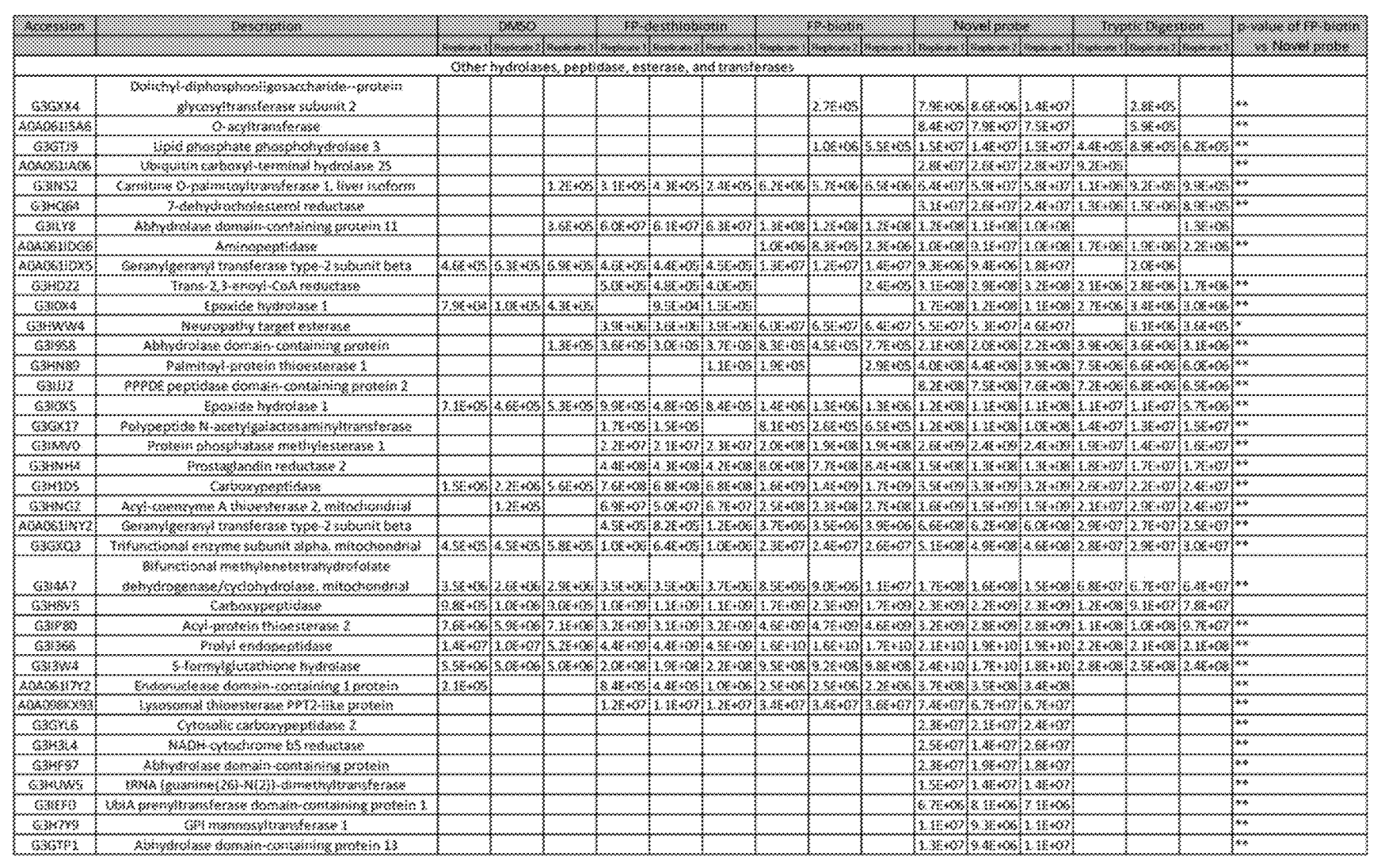

To determine the enrichment efficiency of the novel probes in comparison with that of the commercial ABPP probes, the null cell lysate of ExpiCHO-S cells was treated with different ABPP probes, purified by streptavidin agarose, digested, and analyzed by nano LC-MS/MS in a data-dependent acquisition mode. The resulting mass spectrometry data were processed by Proteome Discoverer embedded with the SEQUEST algorithm using the label-free quantification workflow. Proteome Discoverer uses a filter criterion of two unique peptides. All of the samples were tested with three replicates. The replicates' protein abundance obtained from Proteome Discoverer was averaged, and the ratio of ABPP-enriched sample versus control tryptic digestion sample was calculated. First, the probe-enriched groups were compared with the DMSO control group to exclude the proteins enriched due to agarose nonspecific binding and natural biotinylation. Next, the proteins that have been enriched more than 5-fold by any probes (FP-desthiobiotin, FP-biotin, novel probe) were selected. Finally, the lipases and serine hydrolases (peptidases, esterases, proteases, etc.) were selected and are reported in FIG. 5A, FIG. 5B and FIG. 5C. The protein abundances in each individual replicate are reported in FIG. 6A and FIG. 6B, with *indicating $p<0.05$ and ** indicating $p<0.01$. As shown in FIG. 5, 52 lipases and serine hydrolases were significantly enriched (>5-fold) from null cell lysate by a novel probe compared with the control tryptic digestion sample, including LPL and LAL, which have been previously reported as the root causes of polysorbate degradation. In addition to these lipases that have been reported, many other enzymes are also enriched by the novel probes. For example, cytosolic phospholipase A2a (accession G3GWV5) was enriched 950-fold compared with the control tryptic digestion sample, while group XV phospholipase A2 was enriched 302-fold, suggesting that these enzymes can potentially hydrolyze polysorbate if they are present as HCPs. The label "D" in FIG. 5 denotes that the proteins were not detected in the corresponding tryptic digestion samples, so the ratio cannot be calculated since the denominator is 0. The label "ND" denotes not detected.

Figure 9:
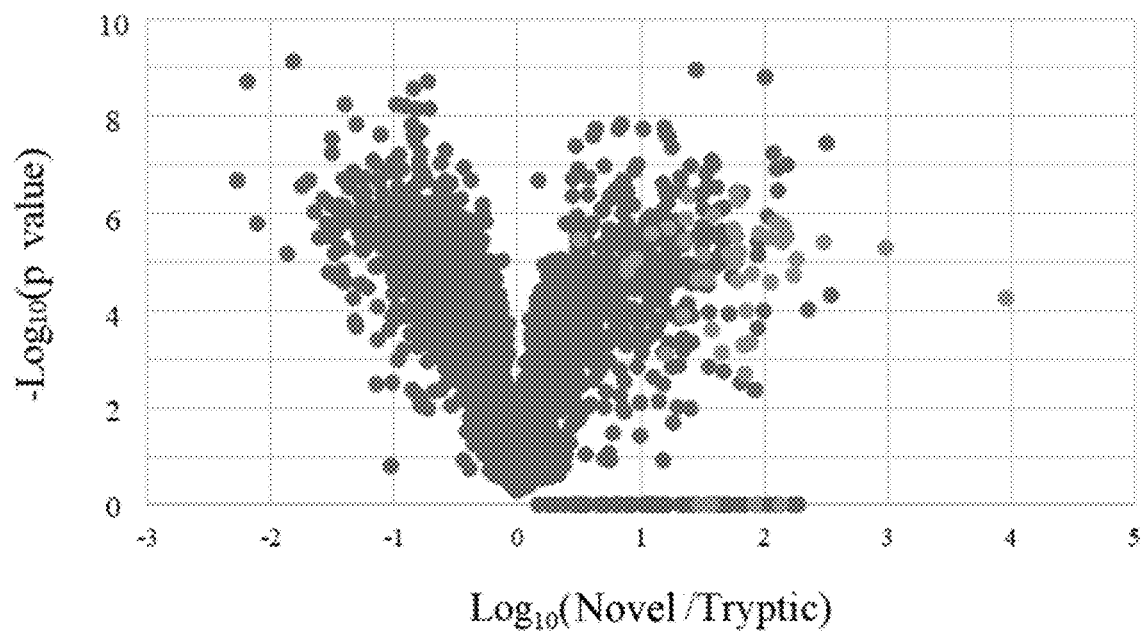
FIG. 9 shows a volcano plot of protein species in samples enriched by a novel probe compared to tryptic digestion samples, according to an exemplary embodiment.

The distribution of enriched lipases/hydrolases in all identified proteins is also shown as a volcano plot in FIG. 9. The lighter dots represent lipases/hydrolases listed in FIG. 5. The darker dots represent other protein species. Several dots overlap with the X axis because those protein species are not detected in multiple replicates of the tryptic digestion sample, so their p value cannot be calculated.

Figure 10:
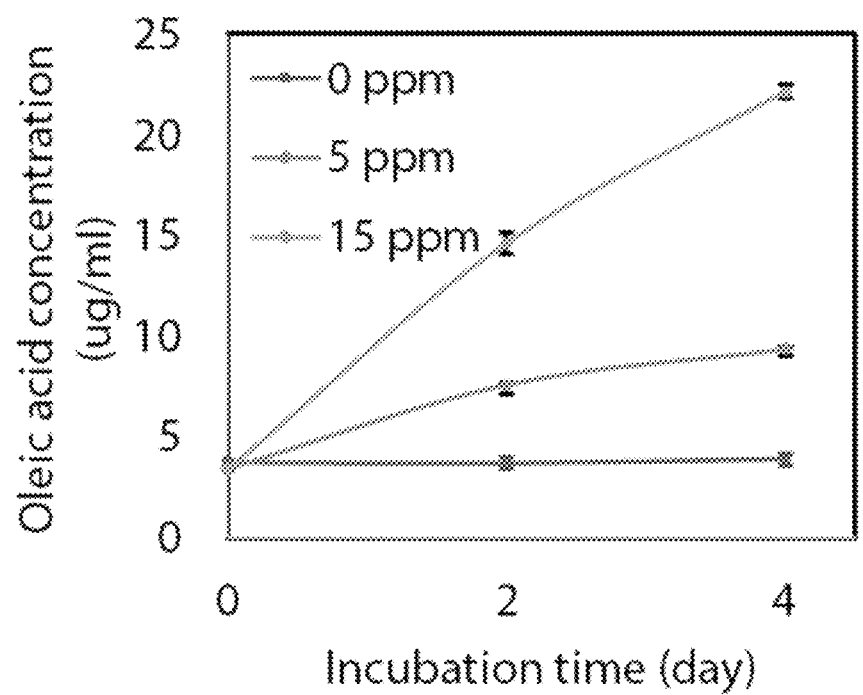
FIG. 10 shows hydrolysis of PS80 by lysosomal acid lipase (LAL) over time, according to an exemplary embodiment.

Compared with commercial serine hydrolase ABPP probes, including FP-biotin and FP-desthiobiotin, the novel probes perform better for most lipase/serine hydrolase enrichment. Remarkably, LAL was not enriched by either commercial probe, yet it was enriched more than 30-fold by a novel probe compared with the control tryptic digestion sample. Because LAL has not been widely recognized as a lipase that can hydrolyze polysorbate, the hydrolysis of polysorbate 80 by spiked LAL was tested. Varying amounts of LAL (0 ppm, 5 ppm, and 15 ppm) were spiked into the samples with 0.1% PS80 at pH 5.5, and the hydrolysis of PS80 was monitored by measuring the release of oleic acid using LC-MS. The data is presented as average value±standard deviation in FIG. 10. 5 ppm of LAL released 3 µg/ml of oleic acid after 2 days of incubation with 0.1% polysorbate, demonstrating that the novel probes uniquely allowed for the identification of a lipase that can hydrolyze polysorbate.

To further compare the affinity of LAL with different ABPP probes, a novel probe and FP-biotin probe were coincubated with LAL for one hour at room temperature. After incubation, the sample was denatured, digested by trypsin, and the peptide digest was analyzed by LC-MS/MS. The data was searched by Byonic software against modification induced by a novel probe (+777.473) and modification induced by FP-Biotin (+572.316). The result showed only peptide $Y^{41}$-$R^{63}$ was labeled by the ABPP probes, and the peak area of the peptide labeled by each probe is listed in Table 1. The data are presented as average value±standard deviation. As shown in Table 1, when equal concentration of a novel probe and FP-biotin was incubated with LAL, no peptide labeled by FP-biotin was observed, while the peptide $Y^{41}$-$R^{63}$ was identified to be labeled by a novel probe, demonstrating that the novel probes have higher affinity toward LAL. In addition to LAL, 30 other lipases/serine hydrolases were not enriched (less than 2-fold) by commercial ABPP probes but were enriched more than 10-fold by a novel probe. These results indicate that the novel probes have higher affinity with lipases and serine hydrolases, resulting in better enrichment efficiency and detection sensitivity in the analysis of active enzymes catalyzing polysorbate degradation.

TABLE 1

Coincubation of a novel probe and FP-biotin with lysosomal acid lipase (LAL)

| | Labeled peptide peak area | |
|---|---|---|
| Probe Concentration | Peptide + 777.473 (novel probe) | Peptide + 572.316 (FP-Biotin) |
| 1 µM novel probe and 1 µM FP-Biotin | $(4.4 \pm 0.1) \times 10^6$ | Not detected |
| 1 µM novel probe and 10 µM FP-Biotin | $(2.5 \pm 0.3) \times 10^6$ | $(8.8 \pm 2.3) \times 10^4$ |

Figure 11A:
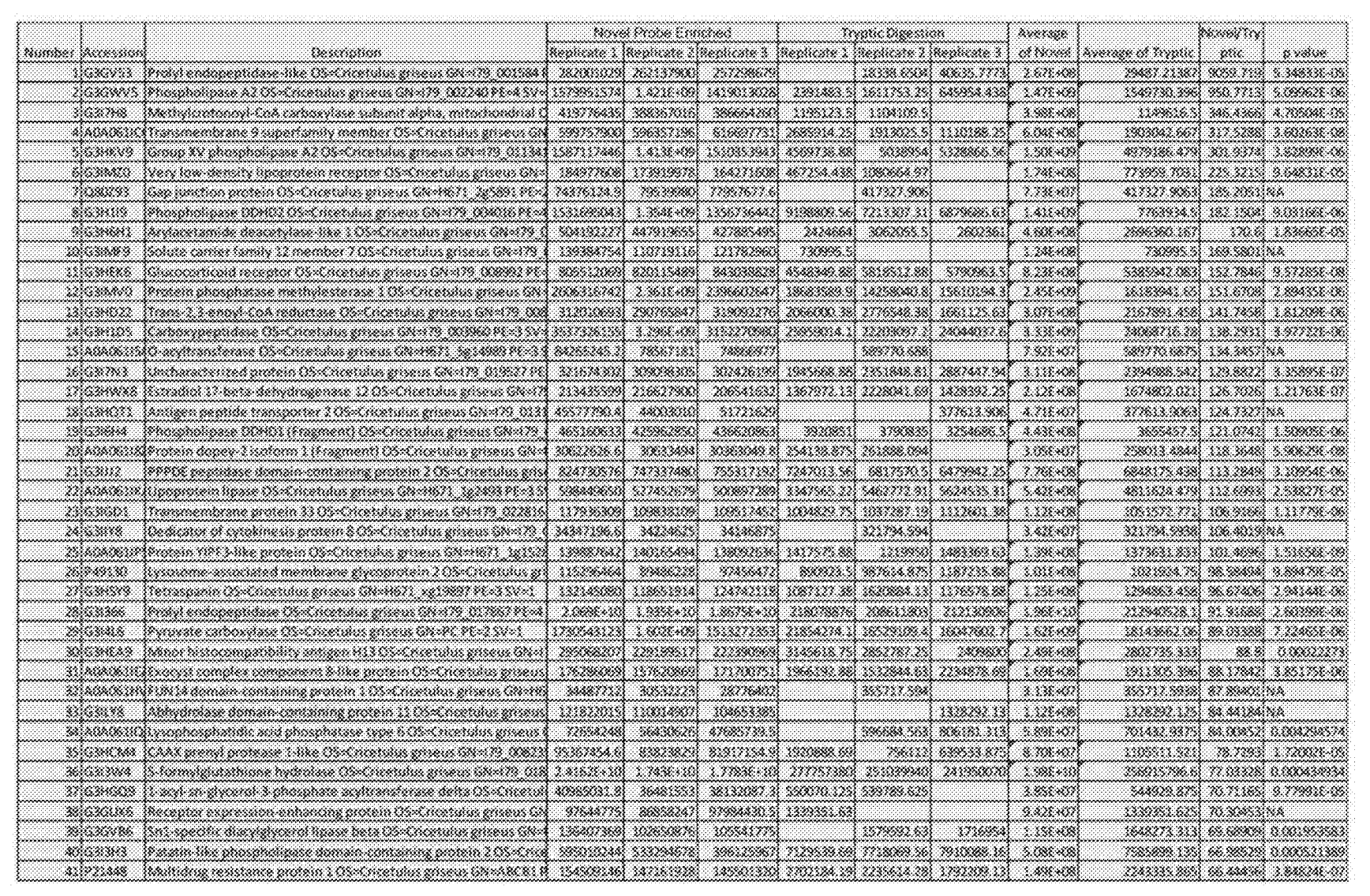
Figure 11B:
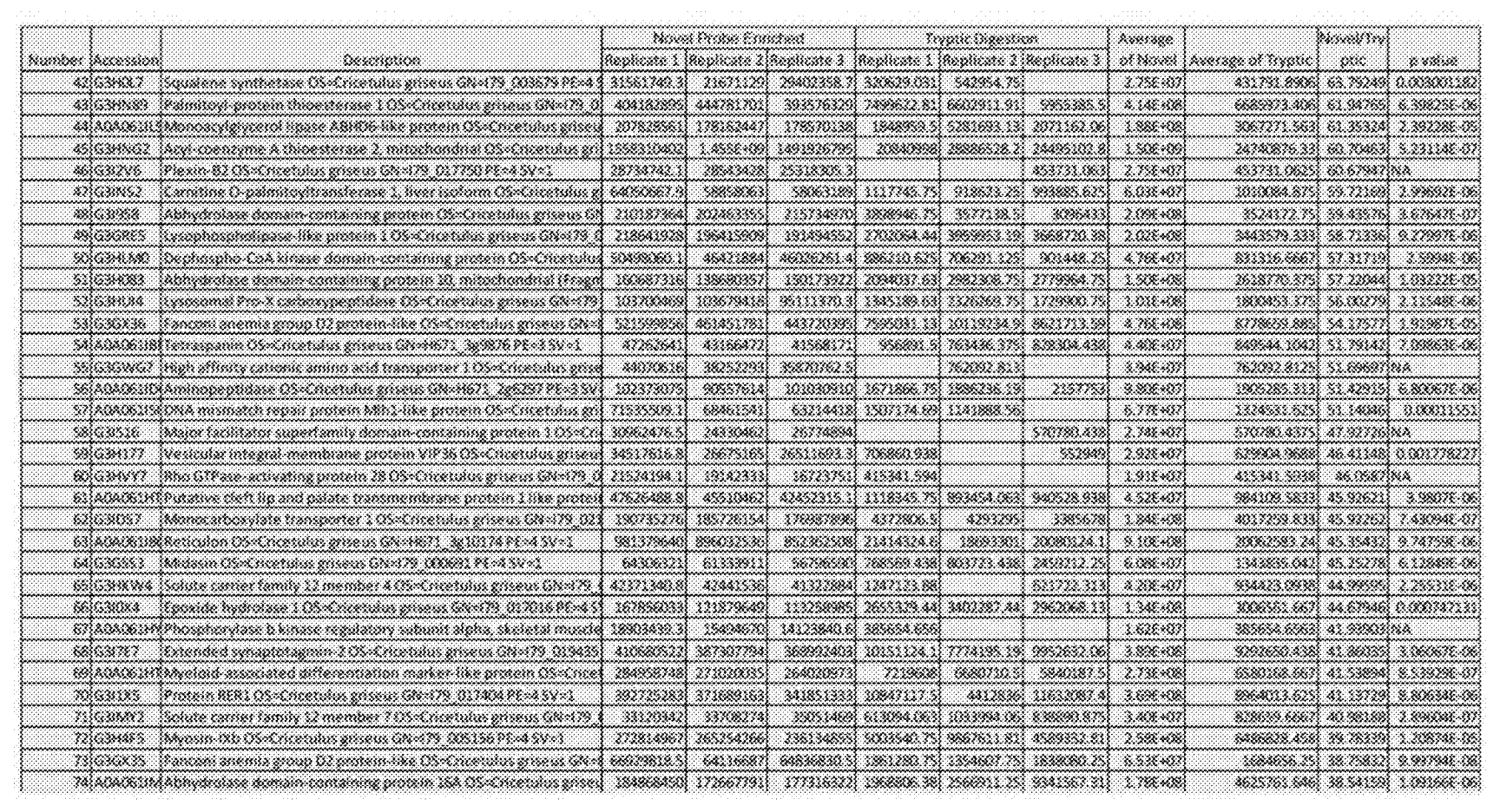
Figure 11C:
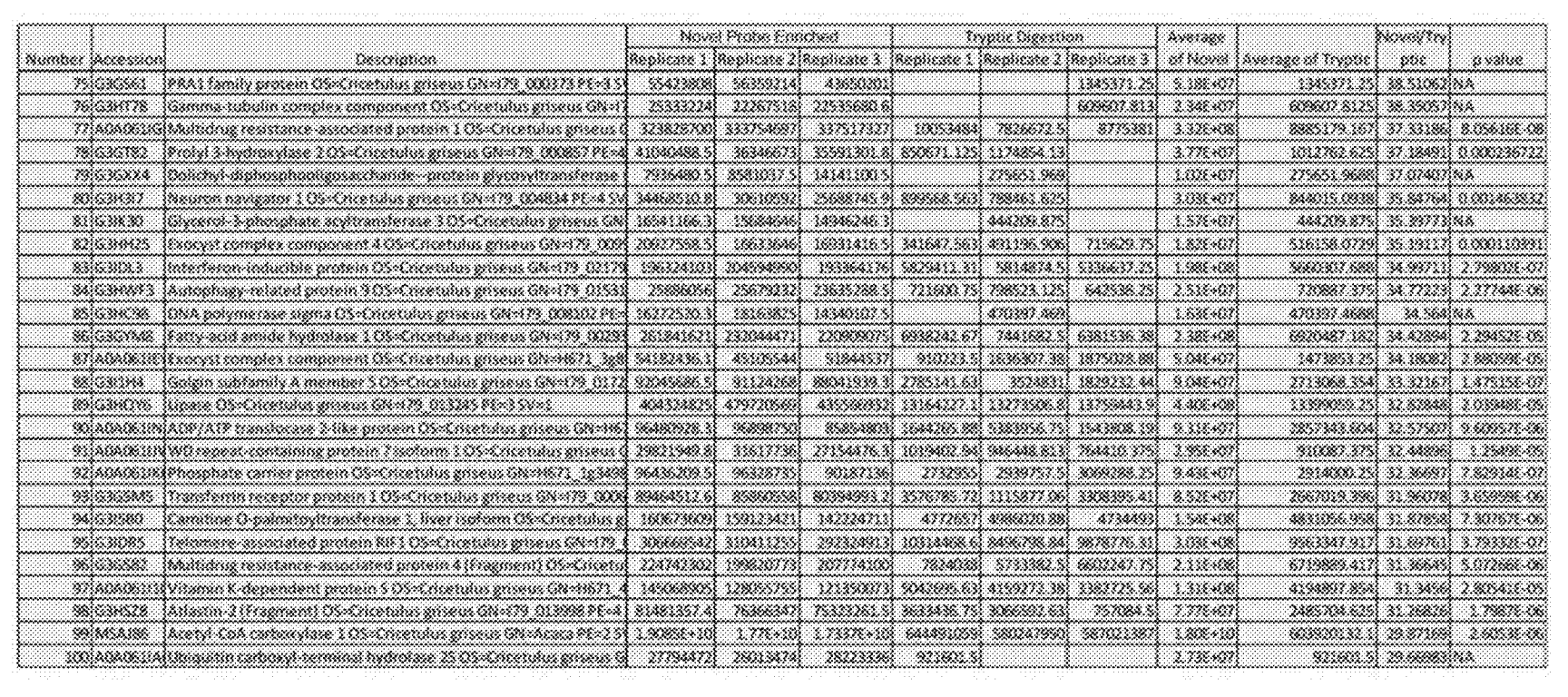
Figure 12A:
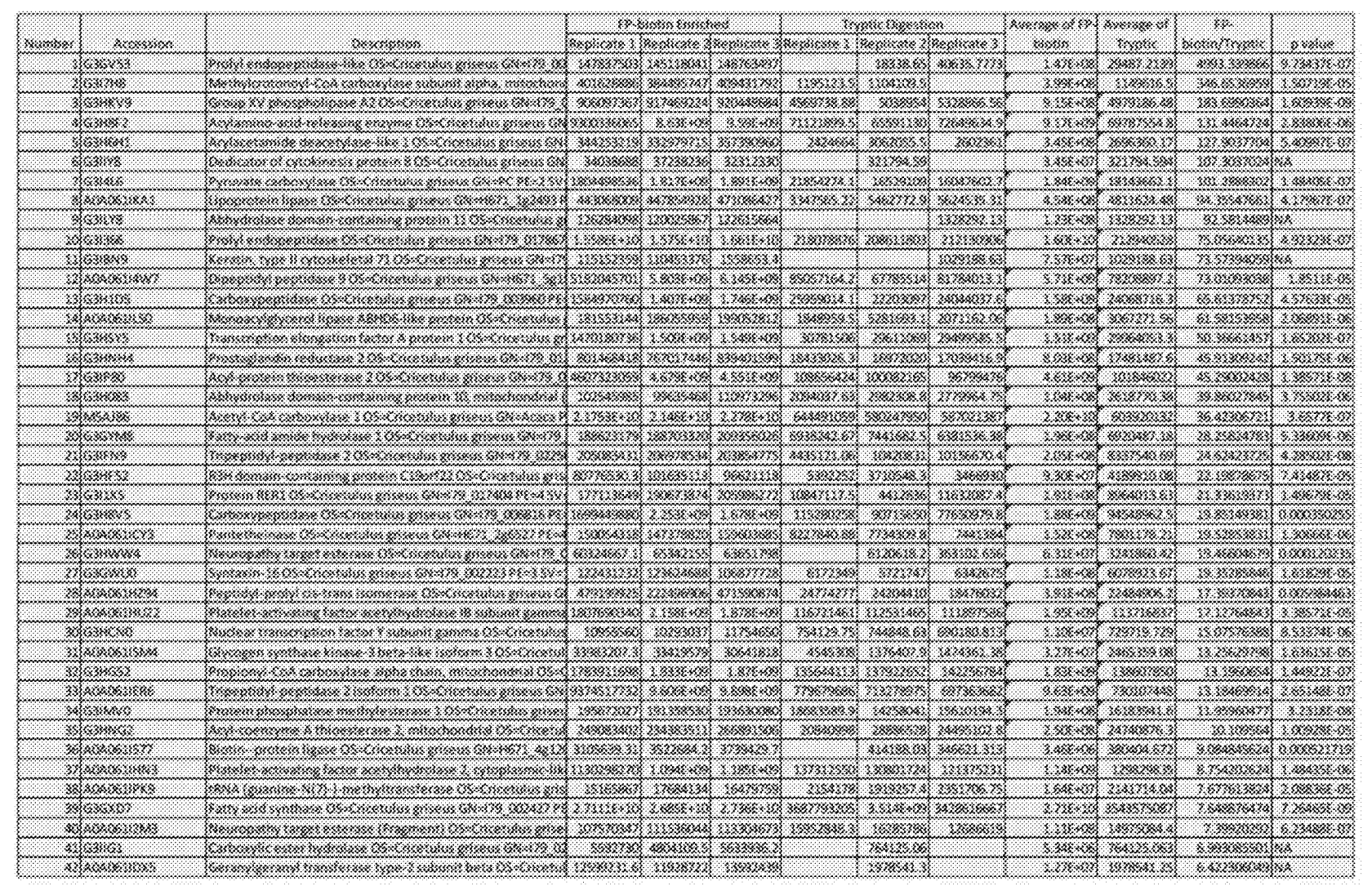
Figure 12B:
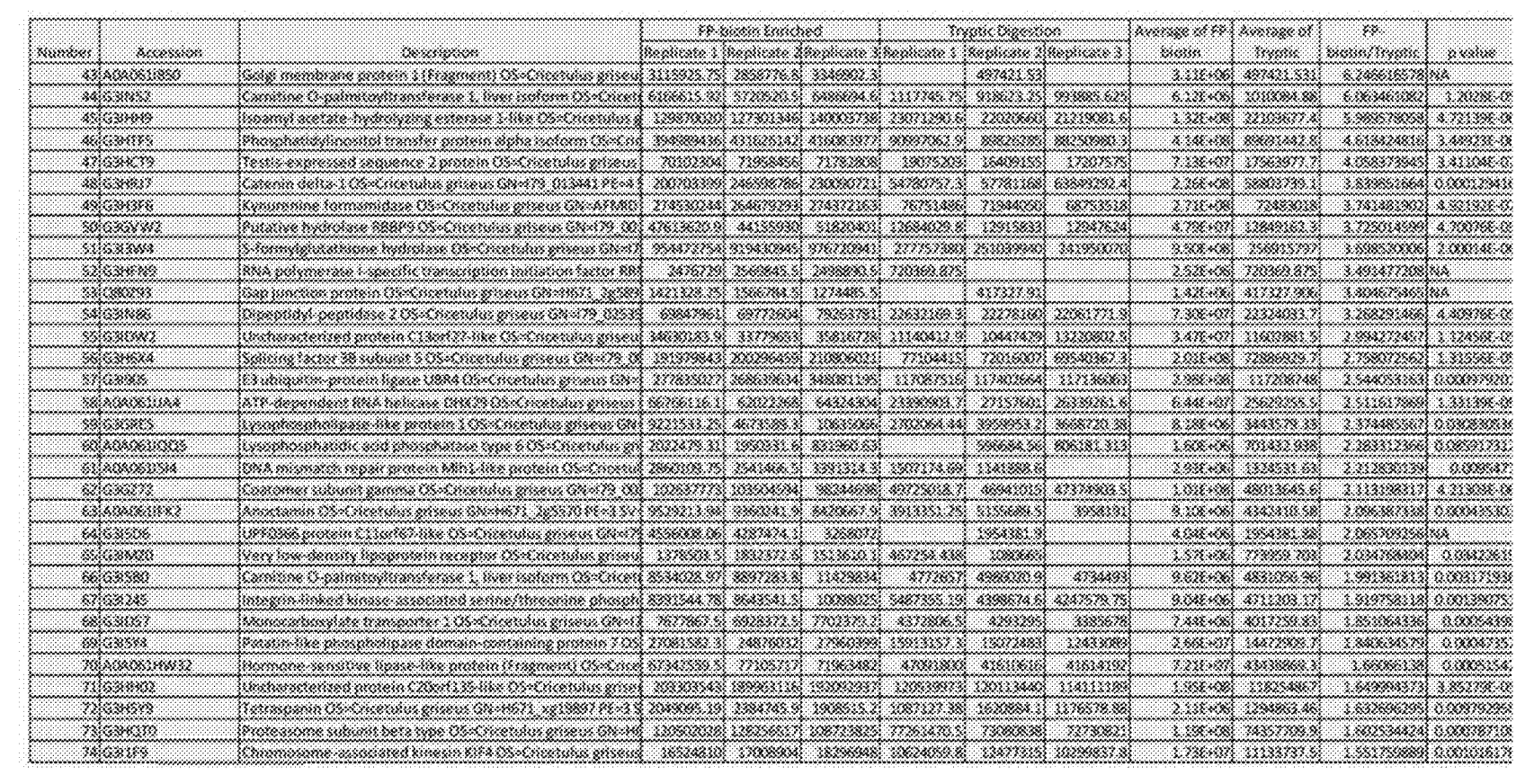
Figure 12C:
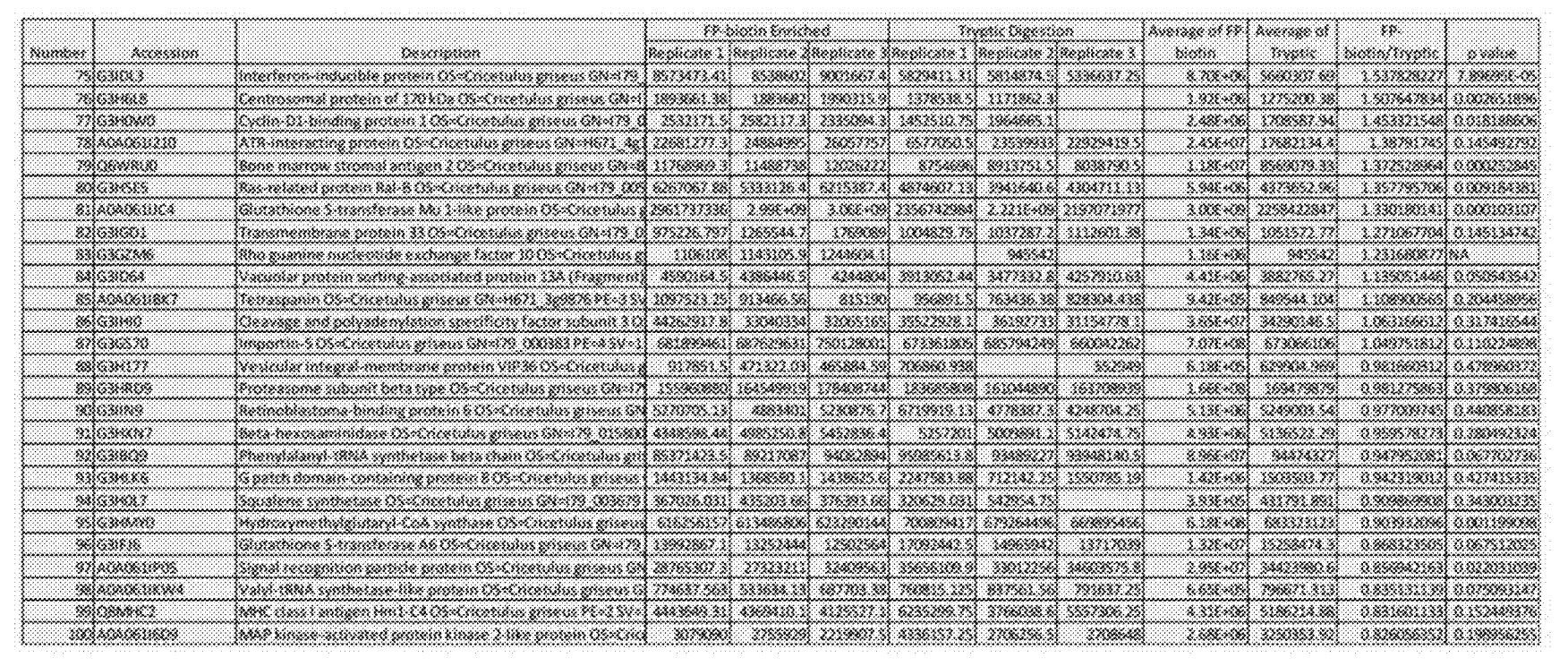

Nonspecific binding is a major limitation for activity-based protein profiling and other pull-down experiments. In addition to lipases and other serine hydrolases, some non-hydrolytic enzymes and proteins are also enriched by the novel probes, as shown in FIG. 11A, FIG. 11B and FIG. 11C, and as compared to enrichment by the FP-biotin probe in FIG. 12A, FIG. 12B and FIG. 12C. Lipases and hydrolases are highlighted. Some p values are N/A because these protein species are not detected in multiple replicates.

There are several possible reasons that can lead to the enrichment of nonhydrolytic proteins. First, proteins containing a lipid binding domain would bind to the fatty acyl chain of the novel probe, such as fatty acid synthase and lipoprotein receptor. Second, some naturally biotinylated proteins can be enriched by streptavidin agarose, such as the carboxylase family. Finally, proteins that have affinity with the hydrophilic agarose bead would also be enriched. However, proteins with the latter two kinds of nonspecific binding were excluded by comparison with the DMSO control, as described above.

Different enzymes have different preferences toward substrates. Although different substrates can have similar target functional groups, e.g., esters and amide, the molecular structure next to the functional group has a significant impact on the enzymatic activity. The novel probes were designed to mimic polysorbate, which enabled the novel probes to have a high affinity for enzymes that can catalyze polysorbate hydrolysis. Compared to the commercially available FP-biotin probe, the fatty acyl chains of the novel probes, for example a 16-carbon fatty acyl chain, have a relatively high affinity to the enzymes that recognize the fatty acyl chain, for example LAL. For example, a previous study demonstrated that LAL has a hydrophobic domain, and that the binding of a substrate's fatty acyl chain to the ProA eluate comprises one high-abundance protein of interest, mAb1, and low-abundance HCPs with a different profile compared to null CHO cell supernatant. This protein profile presents a different set of challenges and components for lipase enrichment.

HCPs from a ProA eluate enriched for serine hydrolase lipases using a novel ABPP probe of the present invention as described above were quantified and compared to an unenriched sample. The fold enrichment is shown in Table 2, where "D" indicates that a protein was detected and "ND" indicates that it was not detected.

TABLE 2

Enrichment of serine hydrolases from ProA eluate using a novel ABPP probe

| Protein | Unenriched sample | Enriched sample | Fold enrichment |
| --- | --- | --- | --- |
| Lipase | D | D | 76 |
| Putative phospholipase B-like 2 | D | D | 2 |
| Lipoprotein lipase | D | D | 9 |
| Leukotriene A-4 hydrolase | D | D | 32 |
| Platelet-activating factor acetylhydrolase-like protein | D | D | 1111 |
| Liver carboxylesterase 1-like protein | D | D | 169 |
| Phosphatidylinositol-glycan-specific-phospholipase D-like protein | ND | D | N/A |
| Group XV phospholipase A2 | D | D | 88 | hydrophobic domain is critical to the catalytic activity of LAL. Moreover, previous published work also suggests that LAL has optimal activity with substrates that contain fatty acyl chains with 12-18 carbons, while LAL has lower activity for substrates with either short or extra-long fatty acyl chains. This substrate preference indicates that the hydrophobic domain of LAL can only fit substrates with a certain length of fatty acyl chain. Although FP-biotin also has a hydrophobic linker, the amide group and the terminal biotin make FP-biotin a poor substrate for LAL.

Figure 13:
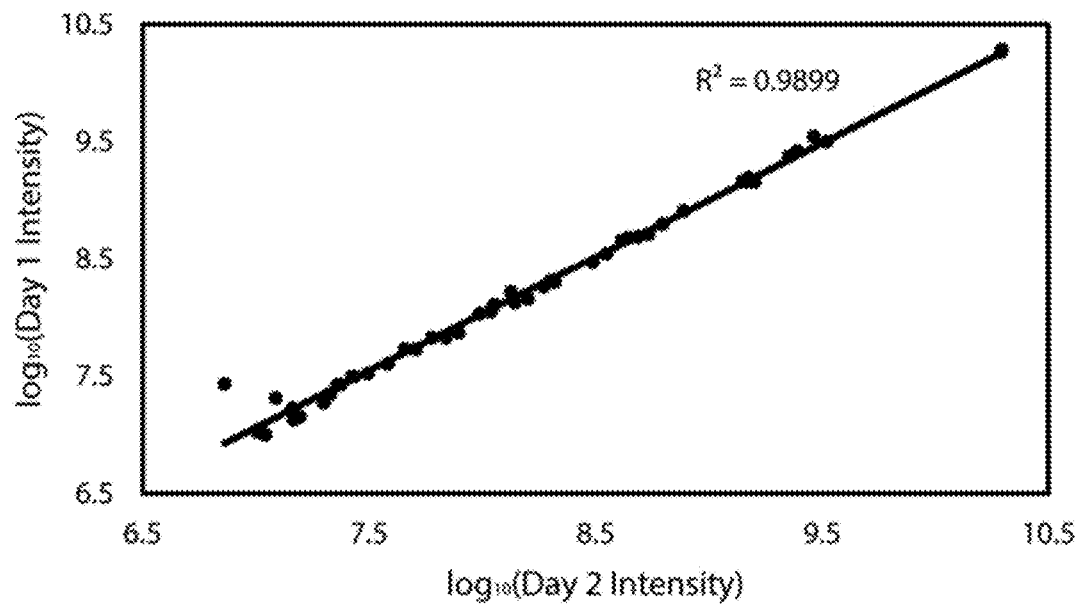
FIG. 13 shows interday precision of the ABPP enrichment method using a novel probe, according to an exemplary embodiment.

To evaluate the interday precision of the novel probes and ABPP method, the entire sample preparation and nano LC-MS/MS analysis were performed on another day, and the signal intensities for lipases and serine hydrolases were compared. The signal intensities of lipases and other serine hydrolases obtained on day 1 were plotted against the values obtained on day 2, as shown in FIG. 13. The ABPP method with the novel probes had good interday reproducibility ($R^2 > 0.99$).

Example 3. Analysis of the Detection Limits of the Novel Probes

As demonstrated in the above examples, the novel probes of the present invention can effectively enrich lipases from complex null cell lysate, and the novel probes have better enrichment efficiency in comparison to commercial ABPP probes, including FP-biotin and FP-desthiobiotin. However, the most common scenario for the ABPP probe application is the detection of a trace amount of enzyme in the presence of background therapeutic proteins. Therefore, it is critical to assess the sensitivity of ABPP probes in the analysis of lipases in DS and throughout the drug development process.

The novel ABPP probes of the present invention were further validated by enriching HCPs in an exemplary sample during recombinant protein production. Monoclonal antibody mAb1 was recombinantly produced in CHO cells and subjected to protein A (ProA) affinity chromatography. A A novel ABPP probe was effective in significantly enriching serine hydrolase lipases of interest from a ProA eluate. These experiments demonstrate that the novel ABPP probes are suitable at a variety of stages of the recombinant protein production process, and can enrich diverse sets of lipases of interest from complex samples of different compositions.

An additional validation experiment was undertaken using drug substance (DS) as a sample. A lipase spiking experiment was designed and performed using a lipase-free DS and three recombinant lipases, including recombinant human LPL, recombinant human PLA2G7, and recombinant CHO LAL. The lipase-free DS is a type of recombinant protein that has been tested by multiple HCP analysis methods, and no lipase was detected. The HCP analysis methods used here include ultralow trypsin native digestion and pro-A depletion, which have been proven to be capable of detecting HCPs with sub-ppm level. The three recombinant lipases were spiked into DS at four different concentrations ranging from 0.016 to 2 ppm. Then, the sample was enriched by a novel probe of the present invention or FP-biotin probe in three replicates. After purification by streptavidin agarose, digestion, nano LC-MS/MS analysis, and data processing, the results of the PSM and unique peptide values of the three lipases were obtained. The entries with equal to or fewer than 1 unique peptide detected were labeled as ND (not detected). The resulting peptide spectrum match (PSM) and unique peptide values are listed in FIG. 14. Statistical analysis was performed between novel probe-treated samples and FP-biotin-treated samples for both PSM and unique peptide values. The p values were labeled at replicate 1 of the novel probe sample, with*indicating $p<0.05$ and ** indicating $p<0.01$.

Figure 14:
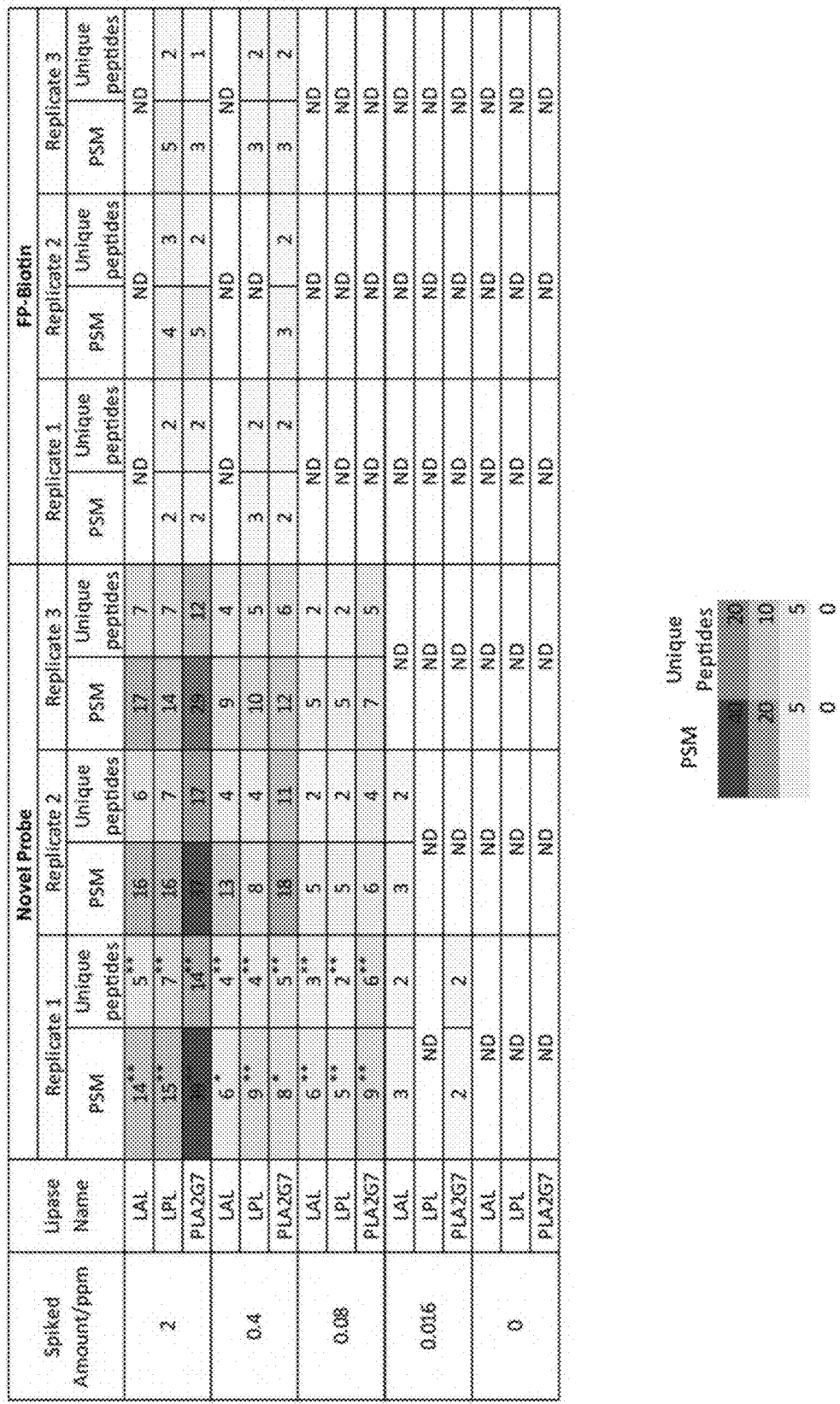
FIG. 14 shows a detection limit analysis of the FP-biotin probe and a novel probe using drug substance (DS) spiked with recombinant lipases, according to an exemplary embodiment.

As shown in FIG. 14, LPL, LAL, and PLA2G7 were effectively and consistently detected in all three replicates by the novel probe-ABPP method at concentrations as low as 0.08 ppm. However, for the FP-biotin probe, the lowest detectable concentration of LPL and PLA2G7 was 0.4 ppm, while LAL was not detected by the FP-biotin probe even at 2 ppm, which is consistent with the previous result of LAL enrichment from null cell lysate by different probes. Additionally, the samples enriched by a novel probe of the present invention had significantly more PSM and unique peptide values in comparison to those processed by the FP-biotin probe. Moreover, for DS samples without any recombinant lipase spiked in, there was no lipase detected with either ABPP probe, which substantiate that the DS used is free of active lipase. Therefore, the novel probe had a significantly higher enrichment efficiency and lower detection limit for all three lipases in the presence of DS. The performance of the novel probe was especially impressive for the enrichment of LAL, considering that the FP-biotin probe could not enrich this lipase at even the highest spiking concentration.

Figure 15:
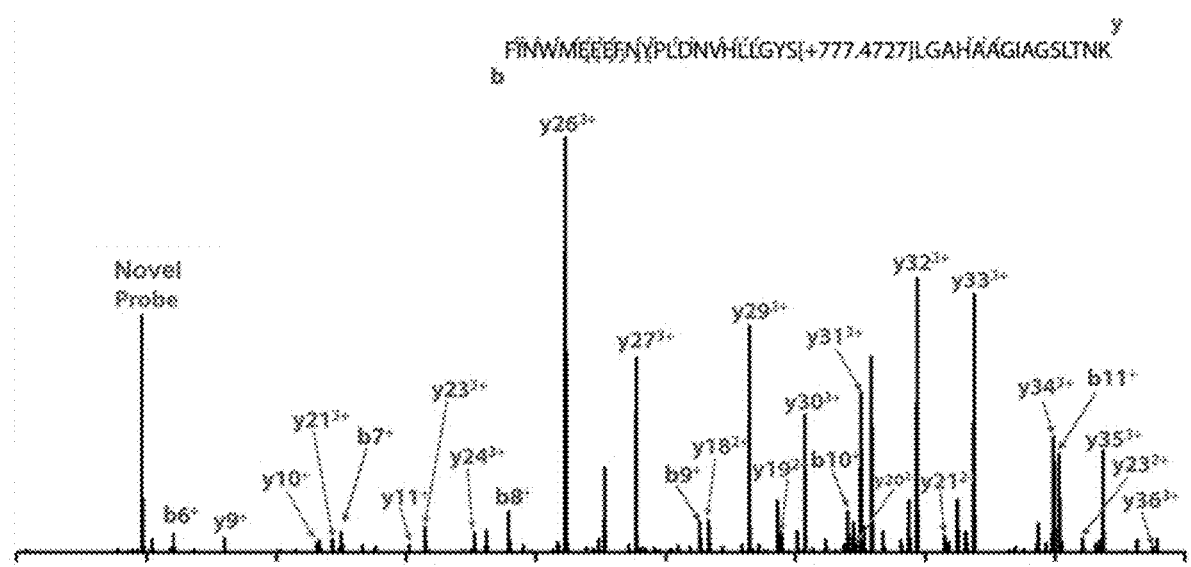
FIG. 15 shows an MS2 spectrum of a peptide from human recombinant lipoprotein lipase (LPL) modified by a novel probe, according to an exemplary embodiment.

Example 4. Covalent Labeling of Recombinant Human LPL at the Active Site by the Novel Probes Based on the mechanism of ABPP, a lipase should be covalently labeled by the ABPP probe at the serine active site. Recombinant human LPL was chosen as a model enzyme to demonstrate that the novel probes covalently label the serine active site of a lipase. Human recombinant LPL was incubated with a novel probe of the present invention, digested, and analyzed by nano LC-MS/MS, as described above. The resulting mass spectrometry data were searched by Byonic for a posttranslational modification with an m/z of 777.473, corresponding to the PTM induced by labeling by this exemplary embodiment of the novel probes of the present invention. The search results showed that the F138-K174 peptide was the only peptide containing this PTM. As shown in FIG. 15, the tandem mass spectrum of this peptide demonstrates that active site S159 was covalently labeled by the novel probe. Additionally, a fragment with an m/z of 796.489 was also observed, and this fragment corresponds to the fragment of this exemplary embodiment of the novel probes of the present invention. These results demonstrate that the novel probes specifically form a covalent bond at the active site of a captured lipase.

The examples above set forth the synthesis and application of novel ABPP probes, which were designed based on the structure of polysorbate. The examples demonstrate that the novel probes have higher enrichment efficiency for lipases compared with commercial ABPP probes for serine hydrolases. Additionally, the novel probes were employed to detect lipases spiked into a clean DS, showing that in some exemplary embodiments the probes have a detection limit of as low as 0.08 ppm for certain lipases. Moreover, the peptide mapping analysis of novel probe-labeled LPL indicated that the lipase is specifically labeled by the probes at the catalytic active site. Therefore, the novel probes have been proven to have a high sensitivity and enrichment efficiency for lipase analysis, rendering these probes a valuable tool for identifying and detecting lipases for biotherapeutics development.

What is claimed is:

1. A probe for capturing an enzyme, said probe comprising:
   (a) a tag;
   (b) a linker covalently coupled to said tag;
   (c) a warhead covalently coupled to said linker; and
   (d) a tail including a carbon chain comprising 10 to 20 carbons, said tail covalently coupled to said warhead, wherein said warhead is capable of chemically reacting with said enzyme and said tag allows for capture and/or detection of said enzyme.

2. The probe of claim 1, wherein said tag is selected from a group consisting of rhodamine, biotin, phosphine, alkyne, azide, acetylene, cyclooctyne, phenyl azide, or omega-terminal azide.

3. The probe of claim 1, wherein said linker comprises polyethylene glycol.

4. The probe of claim 1, wherein said warhead is selected from a group consisting of fluorophosphonate, epoxysuccinate, N-acetylated amino acid, quinolimine methide coupled amino acid, or p-aminomandelic acid coupled amino acid.

5. The probe of claim 1, wherein said tag comprises biotin, said linker comprises polyethylene glycol, and said warhead comprises fluorophosphonate.

6. The method of claim 1, wherein said carbon chain is a 16-carbon chain.

7. The probe of claim 1, wherein the structure of said probe is the probe structure as shown in FIG. 4B.

8. A method for characterizing at least one host cell protein, said method comprising:
   (a) contacting a sample comprising at least one host cell protein to a probe to form a captured host cell protein, wherein said probe comprises a tag, a linker covalently coupled to said tag, a warhead covalently coupled to said linker, and a tail including a carbon chain, said tail comprising 10 to 20 carbons and covalently coupled to said warhead, wherein said warhead is capable of chemically reacting with said host cell protein and said tag allows for capture and/or detection of said host cell protein;
   (b) contacting said captured host cell protein to a solid substrate, wherein said solid substrate is capable of binding to the tag of said probe, to form a substrate-bound host cell protein;
   (c) isolating said substrate-bound host cell protein;
   (d) contacting said isolated substrate-bound host cell protein of (c) to at least one digestive enzyme to form a peptide mixture; and
   (e) subjecting said peptide mixture to mass spectrometry analysis to characterize said at least one host cell protein.

9. The method of claim 8, wherein said host cell protein includes a cysteine protease active site, a serine protease active site, a serine hydrolase active site, a cathepsin active site, a metalloprotease active site, a cholinesterase active site, a lipase active site, a protease active site, a hydrolase active site, an oxidoreductase active site, or an isomerase active site.

10. The method of claim 8, wherein said tag is selected from a group consisting of biotin, phosphine, alkyne, azide, acetylene, cyclooctyne, phenyl azide, or omega-terminal azide.

11. The method of claim 8, wherein said linker comprises polyethylene glycol.

12. The method of claim 8, wherein said warhead is selected from a group consisting of fluorophosphonate, epoxysuccinate, N-acetylated amino acid, quinolimine methide coupled amino acid, or p-aminomandelic acid coupled amino acid.

13. The method of claim 8, wherein said tag comprises biotin, said linker comprises polyethylene glycol, and said warhead comprises fluorophosphonate.

14. The method of claim 8, wherein said carbon chain is a 16-carbon chain.

15. The method of claim 8, wherein the structure of said probe is the probe structure as shown in FIG. 4B.

16. The method of claim 8, wherein said solid substrate comprises agarose beads or magnetic beads.

17. The method of claim 8, wherein said solid substrate binds to said tag using a reagent selected from a group consisting of avidin, streptavidin, alkyne or azide.

18. The method of claim 8, wherein said isolation is performed using centrifugation.

19. The method of claim 8, wherein said digestive enzyme is trypsin.

20. The method of claim 8, wherein said mass spectrometer is an electrospray ionization mass spectrometer, nano-electrospray ionization mass spectrometer, Q-TOF mass spectrometer, or a triple quadrupole mass spectrometer.

21. The method of claim 8, wherein said mass spectrometer is coupled to a liquid chromatography system.

22. The method of claim 21, wherein said mass spectrometer is capable of performing LC-MS (liquid chromatography-mass spectrometry), nano-LC-MS, LC-MS/MS, nano-LC-MS/MS, or LC-MRM-MS (liquid chromatography-multiple reaction monitoring-mass spectrometry) analysis.

23. The method of claim 21, wherein said liquid chromatography comprises reverse phase liquid chromatography, ion-exchange chromatography, size exclusion chromatography, affinity chromatography, hydrophobic interaction chromatography, hydrophilic interaction chromatography, mixed-mode chromatography, or a combination thereof.

24. The method of claim 8, wherein said sample comprises a protein of interest.

25. The method of claim 24, wherein said protein of interest is a monoclonal antibody or a bispecific antibody.

\* \* \* \* \*